(12) United States Patent
Shrock et al.

(10) Patent No.: US 7,037,166 B2
(45) Date of Patent: May 2, 2006

(54) ADVENTURE FIGURE SYSTEM AND METHOD

(75) Inventors: Joel Shrock, Berkeley, CA (US); Matt Brown, Berkeley, CA (US); Adam Tobin, Sausalito, CA (US); Brad Gulko, Sausalito, CA (US)

(73) Assignee: BIG bang Ideas, Inc., Sausalito, CA (US)

( * ) Notice: Subject to any disclaimer, the term of this patent is extended or adjusted under 35 U.S.C. 154(b) by 0 days.

(21) Appl. No.: 10/966,318

(22) Filed: Oct. 14, 2004

(65) Prior Publication Data

US 2005/0153623 A1    Jul. 14, 2005

Related U.S. Application Data

(60) Provisional application No. 60/512,250, filed on Oct. 17, 2003, provisional application No. 60/541,304, filed on Feb. 2, 2004.

(51) Int. Cl.
*A63H 30/00* (2006.01)

(52) U.S. Cl. .......................... 446/175; 446/268; 463/40

(58) Field of Classification Search ................ 446/268, 446/270, 297, 175, 298, 300–303, 436, 484
See application file for complete search history.

(56) References Cited

U.S. PATENT DOCUMENTS

| | | | |
|---|---|---|---|
| 6,443,796 B1* | 9/2002 | Shackelford | 446/91 |
| 6,629,133 B1* | 9/2003 | Philyaw et al. | 709/217 |
| 6,800,013 B1* | 10/2004 | Liu | 446/297 |
| 2002/0111808 A1* | 8/2002 | Feinberg | 704/270.1 |
| 2003/0037075 A1* | 2/2003 | Hannigan et al. | 707/500 |
| 2004/0214642 A1* | 10/2004 | Beck | 463/40 |
| 2004/0259465 A1* | 12/2004 | Wright et al. | 446/297 |

* cited by examiner

*Primary Examiner*—Xuan M. Thai
*Assistant Examiner*—Alex F. R. P. Rada, II
(74) *Attorney, Agent, or Firm*—DLA Piper Rudnick Gray Cary US LLP

(57) ABSTRACT

An adventure figure system and method are described in which a collectable figurine may be used. Each figurine may have a unique serial number wherein each purchaser of a figurine may create an adventure for the particular figurine using a website. The figurine may then be sent out on its adventure. Each person that comes into contact with the figurine may log into the website and update the figurines location.

3 Claims, 30 Drawing Sheets

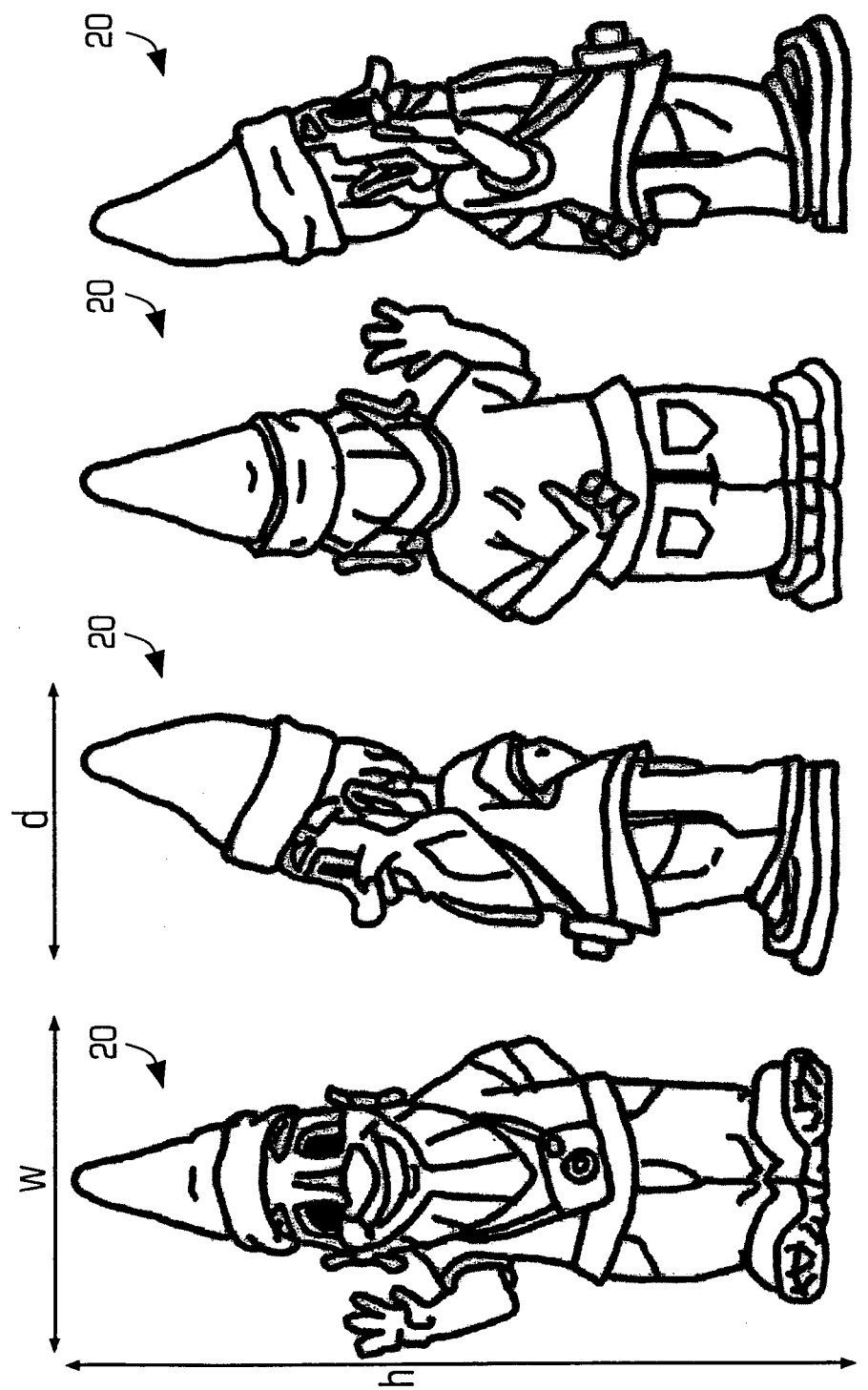

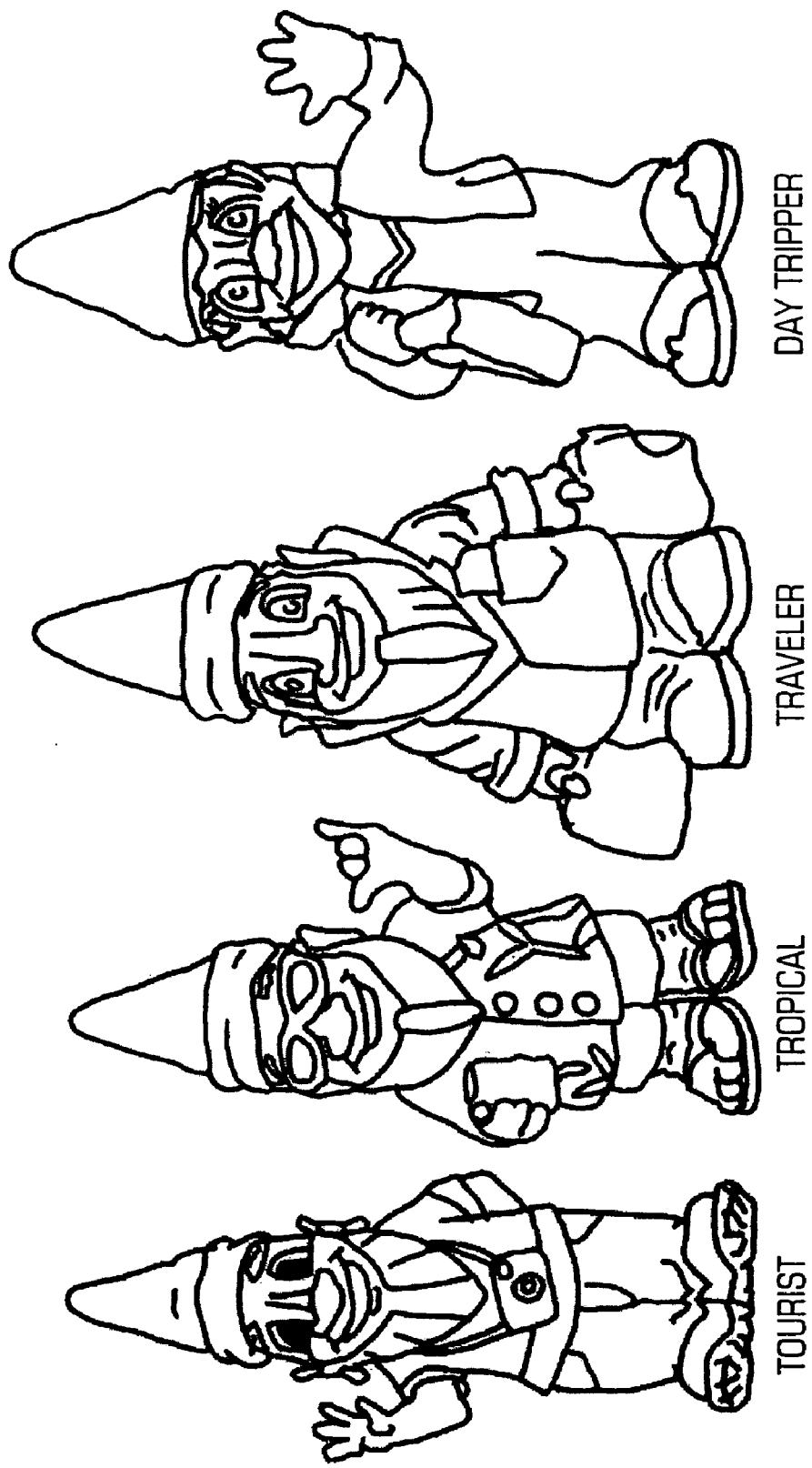

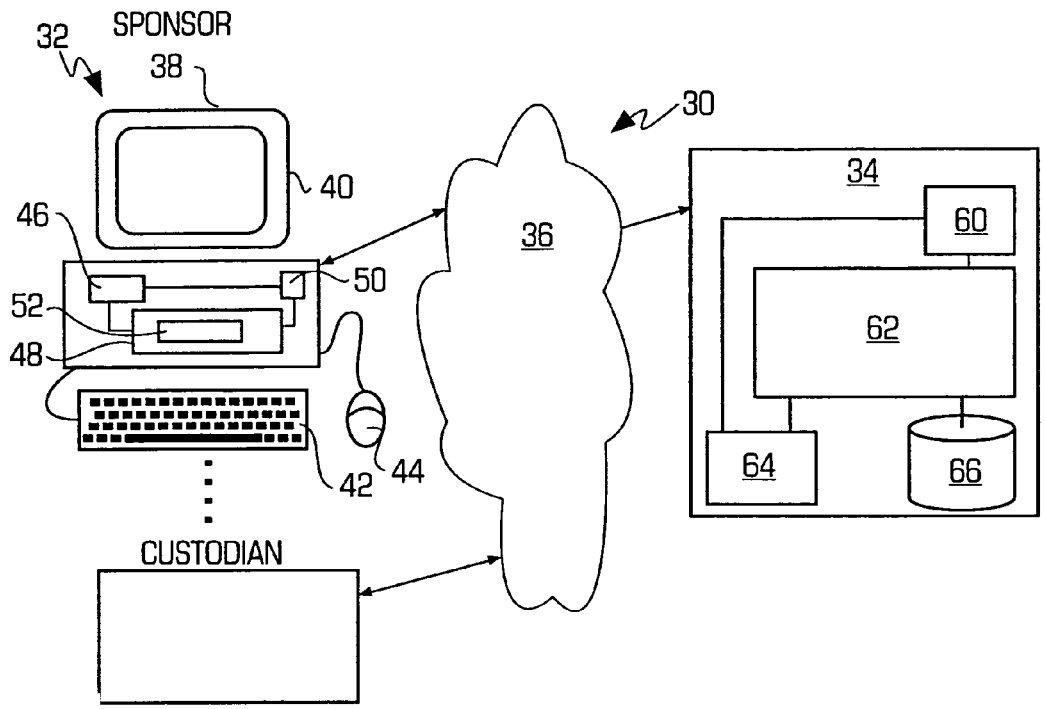
FIG. 3
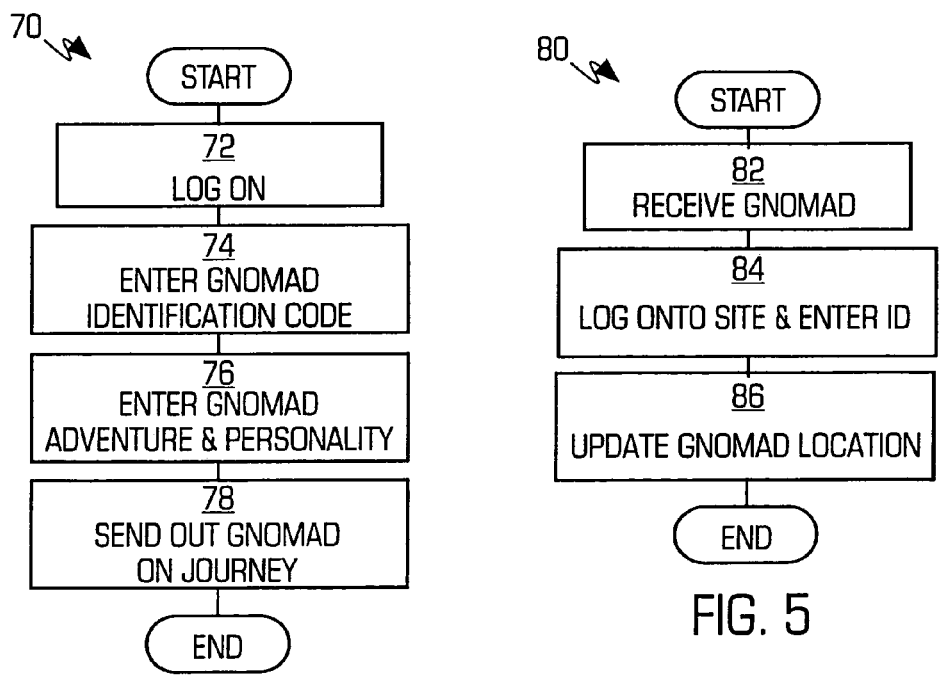
FIG. 4
FIG. 5

FIG. 6F

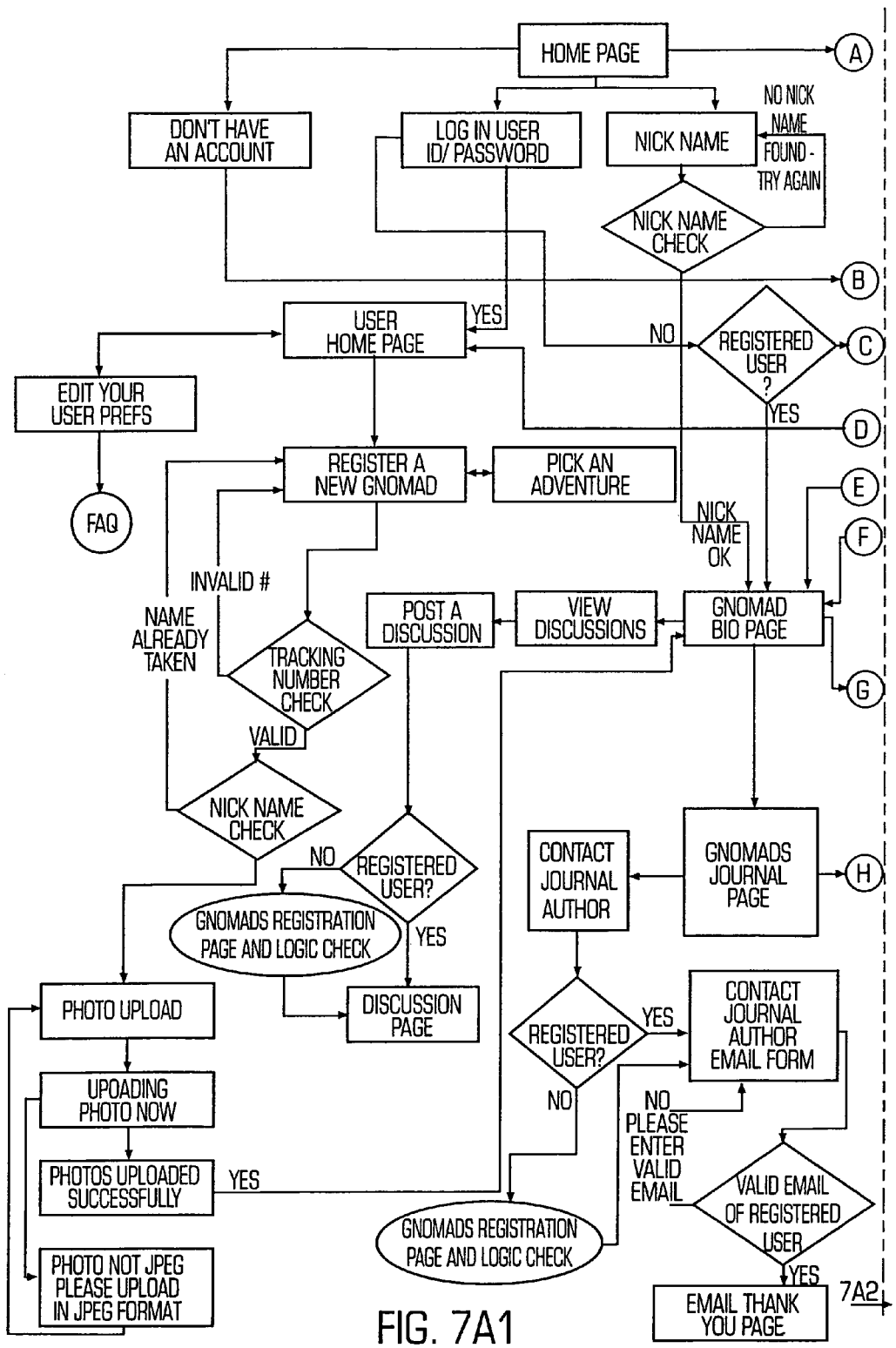
FIG. 7A1

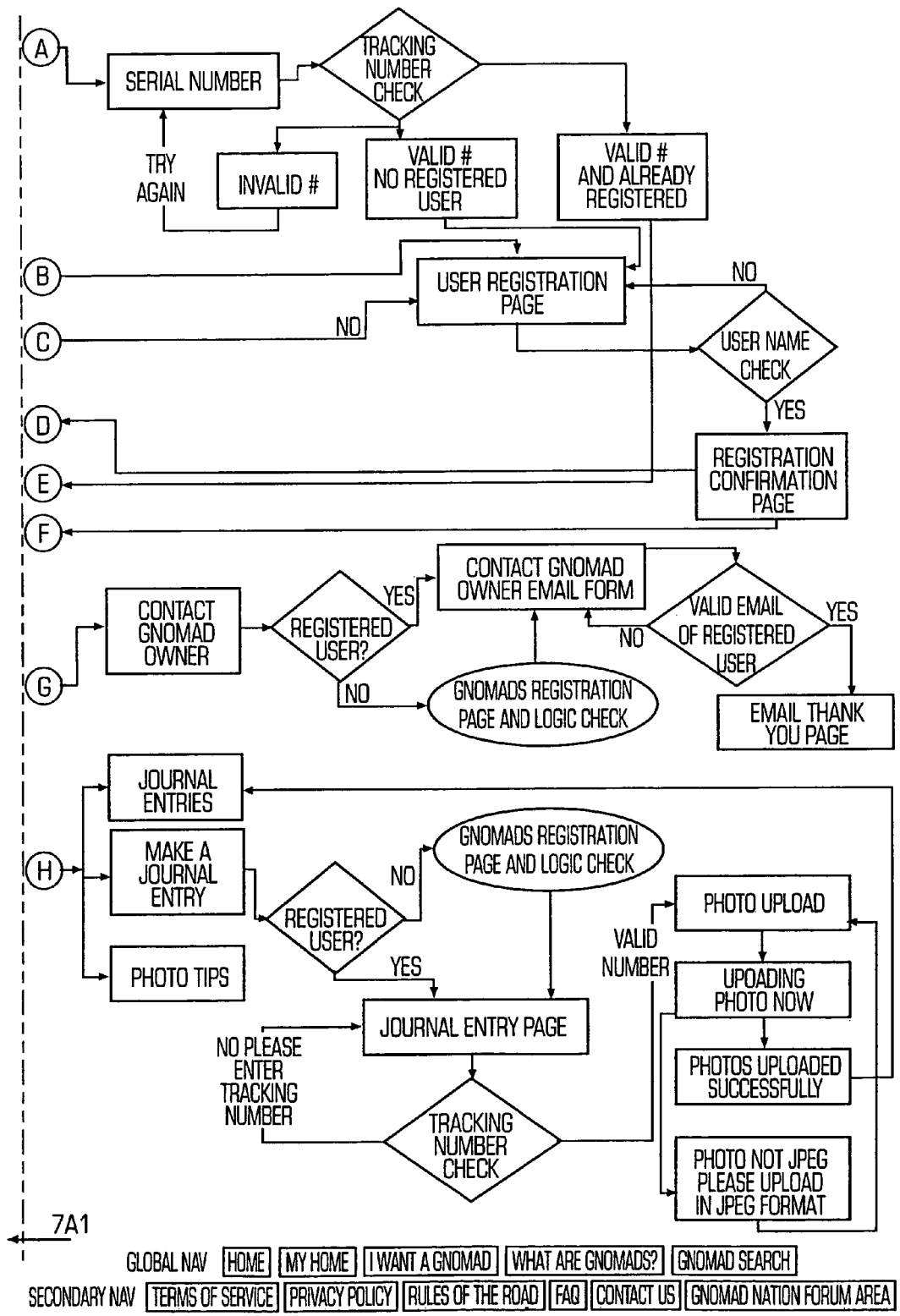
FIG. 7A2

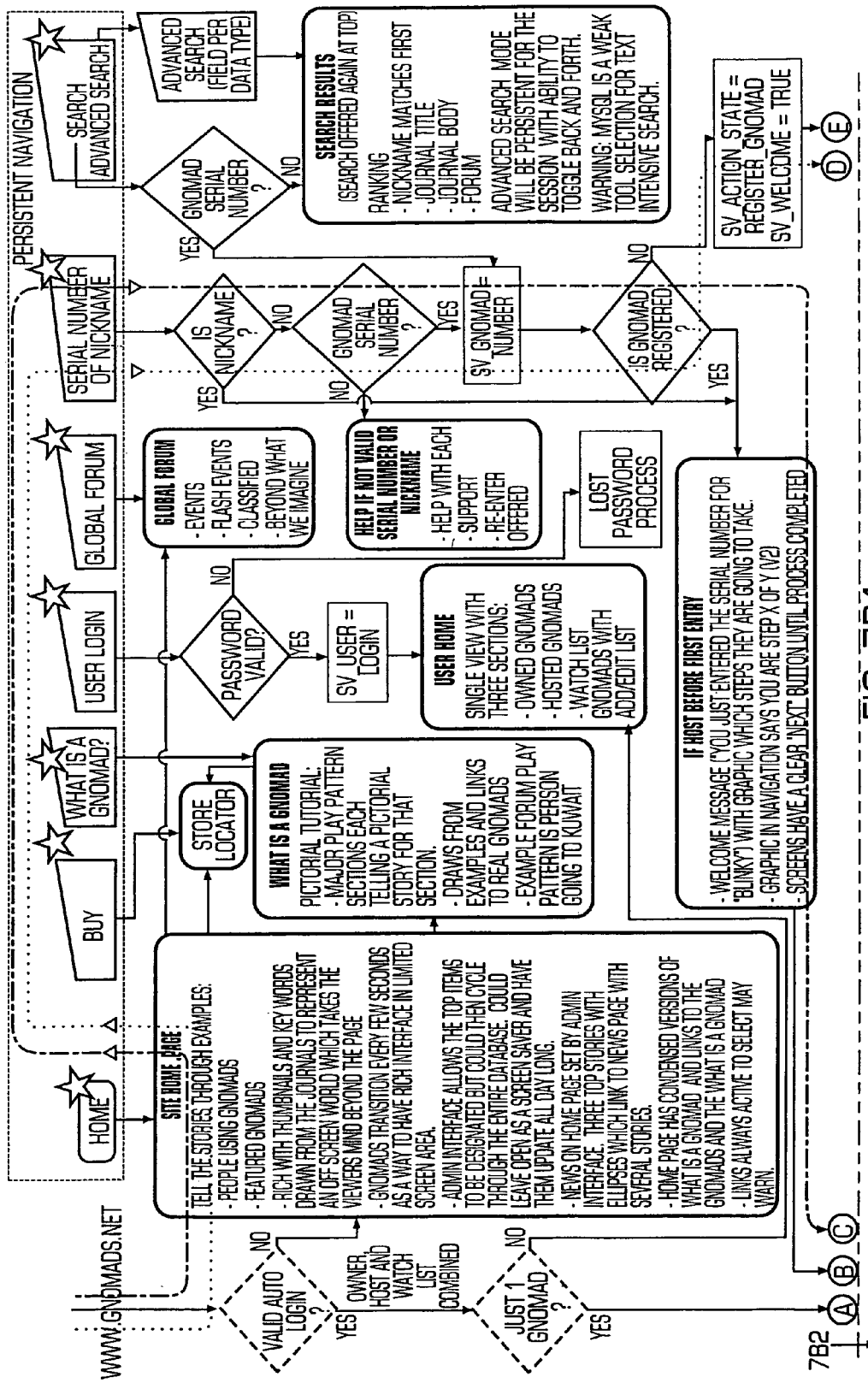

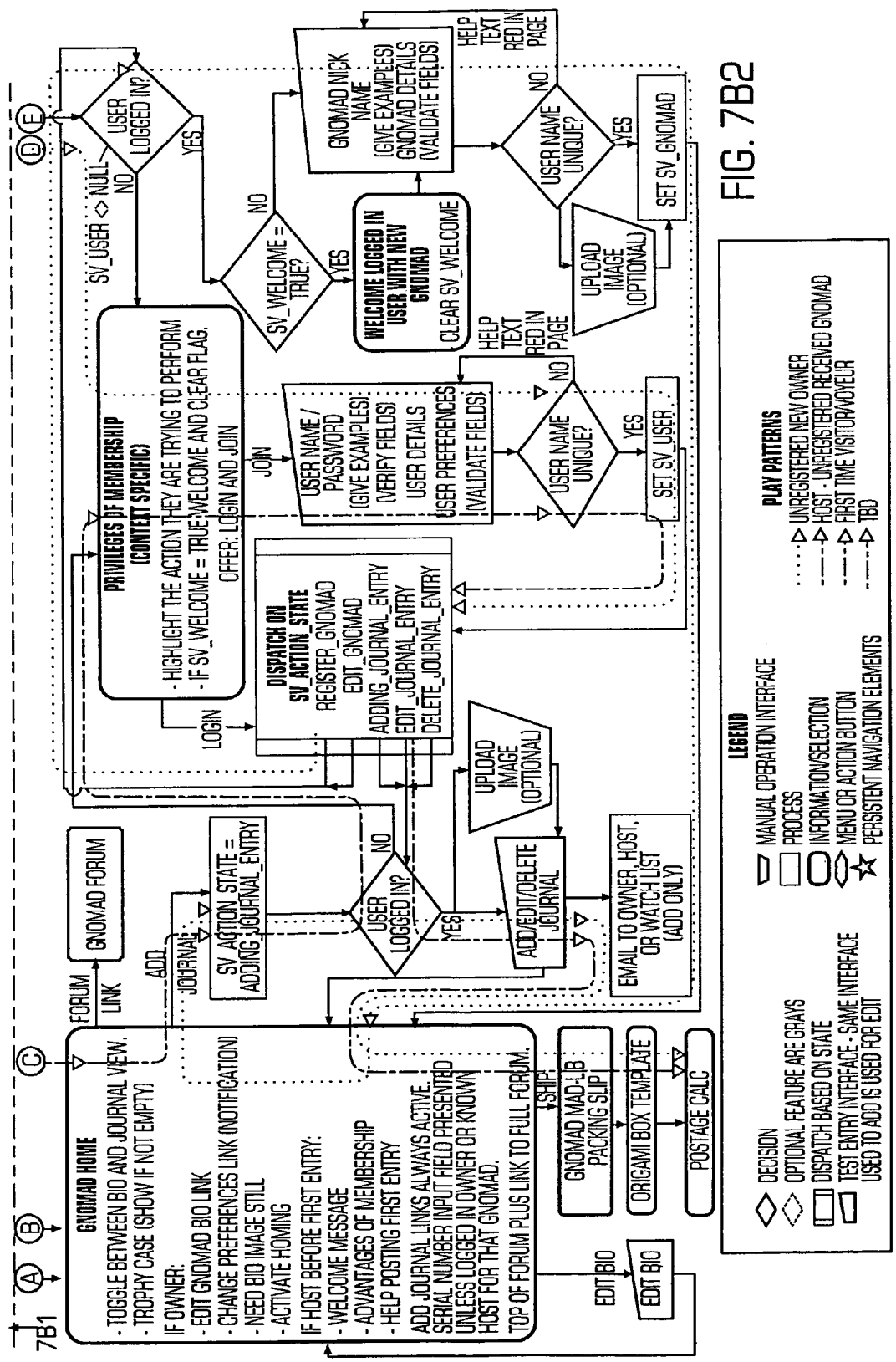
FIG. 7B2

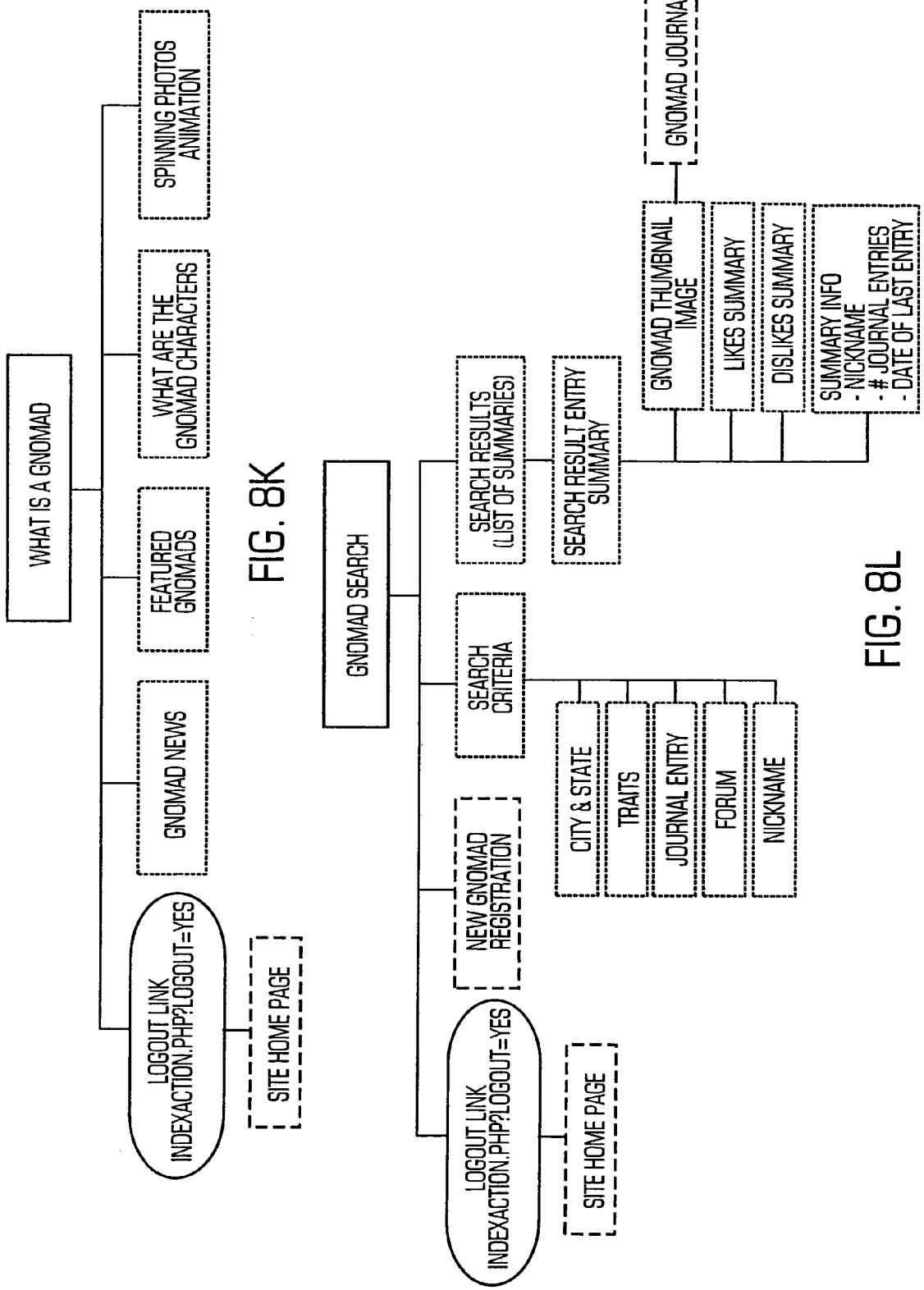

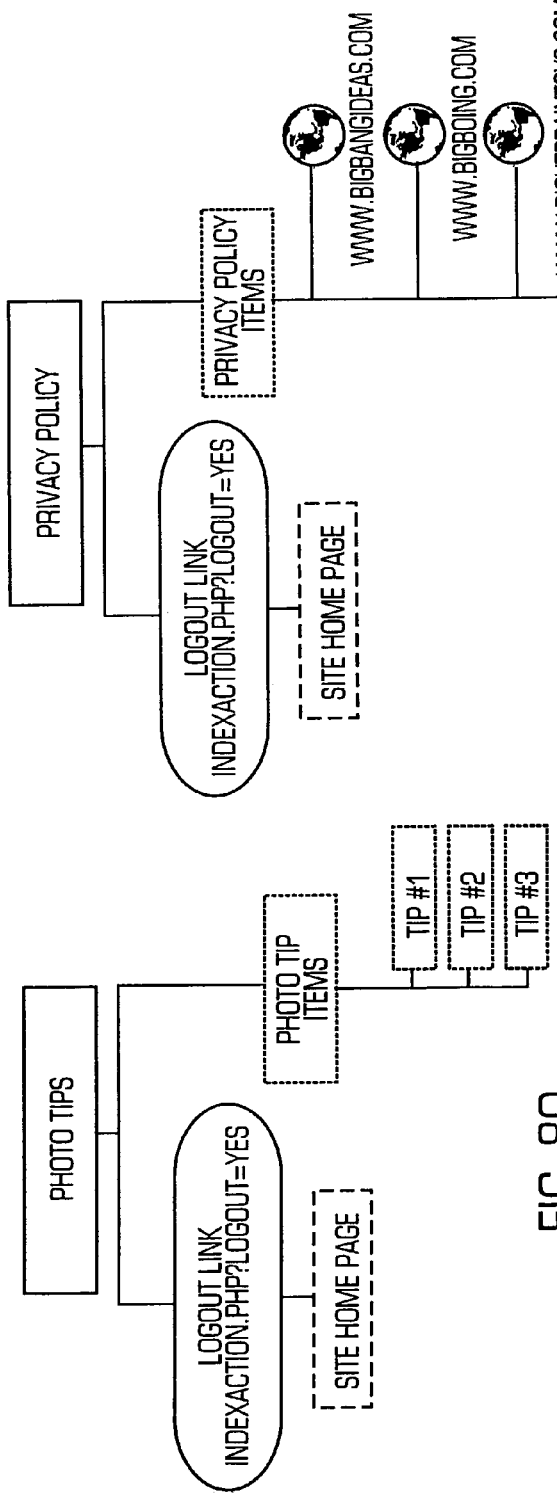
FIG. 8P
FIG. 8O
FIG. 8Q

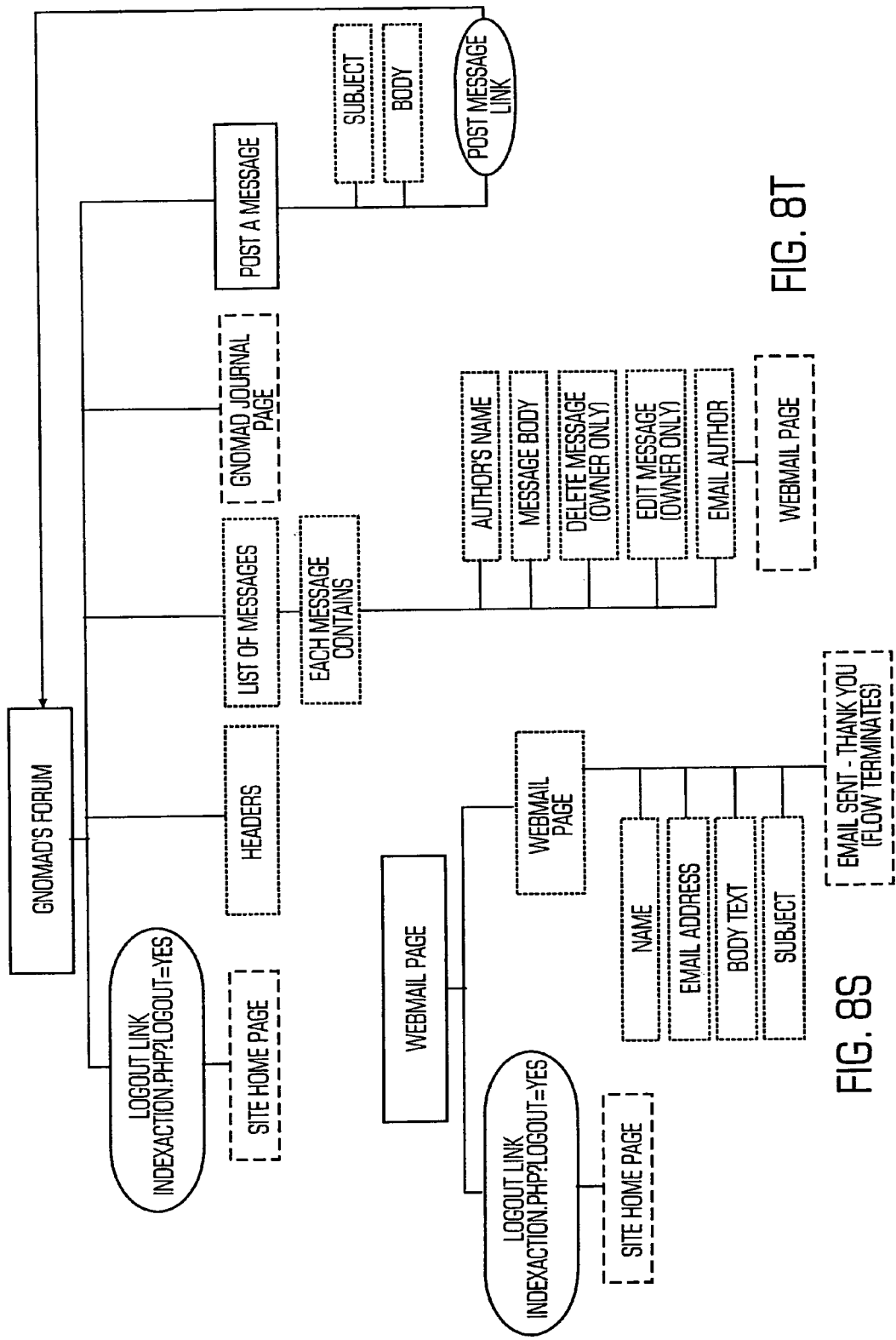

ADVENTURE FIGURE SYSTEM AND METHOD

PRIORITY CLAIMS

This application claims priority under 35 USC 119(e) from U.S. Provisional Patent Application Ser. No. 60/512,250 entitled "Adventure Figure System and Method" and filed on Oct. 17, 2003 and U.S. Provisional Patent Application Ser. No. 60/541,304 entitled "Adventure Figure System and Method" and filed on Feb. 2, 2004, both of which are incorporated herein by reference.

APPENDICES

Appendix A (pages A-1 to A-32) contains further details of the web server/site that is a part of this adventure figure system and method. Appendix B (pages B-1 to B-2) also contains further details of the web site. These appendices form a part of this specification and are incorporated herein by reference.

FIELD OF THE INVENTION

The invention relates to an adventure figure system and in particular to a collectable figurine wherein the user may generate an adventure for the figurine and then track the adventures of the figurine.

BACKGROUND OF THE INVENTION

An adventure figure system is desirable in which a figurine may be sent around the world to achieve a particular goal. There are other social phenomena and products that have some qualities of the adventure figure system, but none that have all of the features of an adventure figure system. In particular, Friendster.com is a website in which people post images, text and other materials as part of developing connections with friends and, simultaneously, a broadening social network. Travel Bears is a classroom phenomena in which kids send teddy bears to other classrooms, friends, or other recipients, who post images and stories to a website built by the class, and then ultimately return the bears to the kids. Geo-caching is a non-directed game that has been developed by people who own and love to use their handheld GPS systems. These "players" will create a treasure site, place a treasure in it, and the post the coordinates (and sometimes a riddle as the key to unlock the treasure site) on a website. Then other players can try to find the treasure site, and if they are successful, they can take the treasure but must leave another treasure for other players. Geocaching.com is a representative site. Wheresgeorge.com is a site where you can type in a serial code of a dollar bill to see where it has traveled. Flash mobs also exists which is described as "sudden gatherings of people at a predetermined location at a predetermined time." The movie Amelie which showed the main character stealing a lawn ornament gnome and taking/sending it on a global adventure. This was a reference to an annual occurrence in Europe in which hundreds of gnomes are sent on travel adventures, only to show up in groups at historical locations, then reappear again at the owners' homes years later. Gnome collecting occurs as there are numerous national and international organizations dedicated to gnome collecting. There is also Everquest which is the most successful multiplayer online game, with over 400,000 active paying subscribers. In this game, there are tools set up to allow people to define their personality and role in a virtual environment, that has now migrated into the real world with conventions, gatherings and perhaps most interestingly, the sale of virtual products for real dollars (millions in the aggregate) on sites like Ebay.com. However, none of these conventional items provides the features and advantages of an adventure figure system. Thus, it is desirable to provide an adventure figure system and it is to this end that the present invention is directed.

SUMMARY OF THE INVENTION

The adventure figure system includes, in a preferred embodiment, a set of characters that are a series of collectable figurines that look like hip, contemporary versions of old European gnomes. What is revolutionary is that figures are intended to be traded, given away, left, delivered, sent— move about the world in any manner possible. When you purchase a figurine you are buying a unique continuing experience—launching a figure on an adventure to see new places, meet new people and tell you all about it.

The system includes the www.gnomads.net website to track the travels of each figurine. Each figure has a unique ID number printed on the bottom of its shoes. After a figure is purchased, it may be registered at www.gnomads.net so that a user may give the figurine its own individual traits (example—likes tiramisu, baseball games, warm weather and really wants to see the Grand Canyon). Most importantly, the user may design an adventure for the figurine character, e.g. meet all the other figurines at Times Square on New Year's Eve, find the best pizza in Italy, or simply go on a business trip. Then once the figurine is registered, the user sends the figurine out in the world on its adventure. Each time the figurine changes hands, its new custodian (a person that comes into contact with the figurine at any time) can log on to the site to, among other things; learn about the personality, history and goals of the particular figurine; post pictures of the figurine eating pizza, visiting Times Square, etc.; post stories about the figurine and update its location; communicate with the owner of the figurine, if the owner chooses to permit emailing, visit a Hall of Fame of figurines that have accomplished note worthy adventures; see which figurines have initiated their homing beacon on the site, and help the figurine get home; create contests for figurines; and buy and personalize a new figurine.

In a preferred embodiment, the figurine may be hollow. Because a figurine is hollow, an owner or custodian can also place a written message inside of the figurine. Then, a Custodian that receives a figurine can also read the note inside and put a new note in, if they'd like. The adventure figure system combines the community building of pen-pals, the mystery and excitement of a message-in-a-bottle, and the thrill of vicarious and unpredictable traveling.

In accordance with the invention, the server and web site may be protected with a combination of password, nickname and serial codes that provides 3 different levels of access to the site features. For example, if you know all three, you have full access to personalize and change all actions. If you know the nickname and serial code, you have medium access— namely, access to all of the custodian features. Finally, if you know only the serial code, you have minimum access, such as to only read the profile of the Gnomads figure. In one embodiment, the serial code is published and distributed on the physical Gnomads figure. In accordance with the invention, a purchase of the figurine provides the user with access to a website and web features wherein at least a portion of the price of the figurine is used to support the web server and web site.

BRIEF DESCRIPTION OF THE DRAWINGS

FIGS. 1A–1D are diagrams illustrating different views of an adventure figurine in accordance with the invention;

FIG. 2B illustrates examples of other adventure figurines in accordance with the invention;

FIG. 3 is a diagram illustrating a computer system for creating and tracking a figurine adventure in accordance with the invention;

FIG. 4 is a flowchart illustrating a method for generating a figurine adventure in accordance with the invention;

FIG. 5 is a flowchart illustrating a method for taking custody of a figurine in accordance with the invention;

FIGS. 6B–G are screen shots illustrating an example of the user interface of the web site shown in FIG. 6A;

FIGS. 7A and 7B are diagrams illustrating more details of another embodiment of the adventure figurine web site flow in accordance with the invention.

DETAILED DESCRIPTION OF A PREFERRED EMBODIMENT

The invention is particularly applicable to a gnome figurine and it is in this context that the invention will be described. It will be appreciated, however, that the adventure figure system in accordance with the invention has greater utility since the figurine may be any other character or figure.

Figure 2A:
FIG. 2A is another diagram illustrating an example of the adventure figurine.

FIGS. 1A–1D are diagrams illustrating different views of an example of an adventure figurine 20 in accordance with the invention, FIG. 2A is a gray scale representation of the figurine 20 and FIG. 2B illustrates other examples of the adventure figurine. In particular, front view, left side view, back view and right side view, respectively of the figurine are shown. In this example, the figurine is a gnome figure with a camera around its neck. As described above, the adventure figure system is not limited to the figurine shown in FIGS. 1A–D and 2A. In a preferred embodiment, the figurine may have a height, h, of 110 mm, a width, w, of 53 mm and a depth, d, of 43 mm. Thus, the figurine is easy to carry and ship around the world so that the particular figurine may carry out its adventure as described below in more detail. In a preferred embodiment, each figurine may be made of a plastic material that is resistant to damage, but lightweight. In accordance with the invention, each figurine has a unique identifier so that each figurine may be tracked using the computer system described below. In accordance with the invention, there may be a total of seven unique figurines (such as seven gnomes with different gestures and clothing for the example shown in FIGS. 1A–D and FIG. 2A), but the invention is not limited to any particular number of figurines. In accordance with an alternative embodiment of the invention, each figurine may be hollow (for storage of a note or treasures from the adventure of the figurine) and/or may have a GPS receiver embedded into the figurine. FIG. 2B illustrates other examples of the adventure figurine in accordance with the invention. As shown, the adventure figurine may include a tourist adventure figurine, a topical adventure figurine, a traveler adventure figurine and a day tripper adventure figurine.

FIG. 3 is a diagram illustrating a computer system 30 that is part of the adventure figure system that may be used for creating and tracking a figurine adventure in accordance with the invention. In particular, the computer system may be a typical client/server architecture wherein one or more client computers 32 may access a web server 34 over a computer network 36, such as the Internet. In accordance with the invention, the computer system shown permits 1) a purchaser of a figurine (known as a "sponsor") to personalize the figurine and generate an adventure for that figurine using the web site generated by the web server; and 2) a person that comes into contact with a figurine on its adventure (known as a "custodian") to access information about the figurine, such as its adventure, and enter information about the figurine and its current location. The computer system also permits any person that has come into contact with a particular figurine to be able to access information about that figurine and its adventure. As shown, each client computer 38, such as the sponsor computer system shown, may be a typical personal computer system, a laptop computer system, a personal digital assistant, a PocketPC computer system, a wireless phone system, etc. that is capable to accessing the web site, receiving textual and/or graphical information from the web site about a figurine and inputting textual and/or graphical information about the figurine into the web site. In the example shown in FIG. 3, each client 38 may further comprise typical computer system components that are well known, such as a display system 40, one or input/output devices, such as a keyboard 42 and a mouse 44 as shown, a processor 46 that controls the operation of the computer system, a memory 48 that stores software, code and operating system being executed by the processor and a persistent storage device 50 that stores the software, code and operating system when the computer system is turned off. The computer system also has some device (not shown) that permits access to the computer network and therefore the web server, such as a modem, a DSL modem, a cable modem, a wireless modem, etc. When accessing the web server 34, the computer system may use a well known browser application 52 stored in the memory 48 that is being executed by the processor 46 to exchange data and information with the web server 34.

The web server 34 may further include well known components of a server computer, such as one or more processors 60, a memory 62, a persistent storage device 64 and a database 66. The operation of the processor, memory and persistent storage device are well known. The database 66, to implement the adventure figure system in accordance with the invention, may include a data structure containing information about each figurine (based on its unique identification code) such as unique characteristics of each figurine, the adventure for each figurine, the status of each figurine's adventure, the people that have come into contact with the particular figurine, the information about the particular figurine including text, messages and photos, etc. Thus, the database 66 stores the information associated with the adventure figure system. To implement the adventure figure system, the server may execute one or more pieces of software that generate and display a user interface to the users of the system based on the information contained in the database, store information into the database, etc. In particular, the server may include a security module (see below), a user interface module (a web page server), a database management module and other modules to handle the various tasks shown in more detail in FIG. 6A.

In accordance with the invention, the server and web site may be protected with a combination of password, nickname and serial codes that provides 3 different levels of access to the site features. The server computer may have a security module (implemented in software in a preferred embodiment with a plurality of lines of computer code that implement the functionality described below) that implements the security features. For example, if you know all three, you have full access to personalize and change all actions. If you know the nickname and serial code, you have medium access—namely, access to all the Custodian features. Finally, if you know only the serial code, you have minimum access, such as to only read the profile of the Gnomads figure. In one embodiment, the serial code is published and distributed on the physical Gnomads figure. In accordance with the invention, a purchase of the figurine provides the user with access to a website and web features wherein at least a portion of the price of the figurine is used to support the web server and web site. Further details of the web server/web site are contained in Appendix A that forms a part of this application.

To implement the adventure figure system, each figurine sold to a consumer may include a unique identification number, a web address (that sends the user to the web server 34) and a prompt to visit the web site. FIG. 4 is a flowchart illustrating a method 70 for generating a figurine adventure in accordance with the invention. In particular, a user that purchases a figurine (a sponsor) may log onto the web site in step 72 and then enter the unique figurine identifier in step 74. The sponsor is the person that owns the particular figurine, customizes it online (e.g. picks a name, defines its likes and dislikes, picks or designs the figurine's adventure) and on the product (may color it, or customize in any way the Sponsor so deems). Then, in step 76, the sponsor may generate a personality for the particular figurine (such as basic personality traits—your figurine likes pizza, baseball games, warm weather and really wants to see the grand canyon) and may enter an adventure for that figurine. In step 78, the sponsor may send the figurine on its adventure.

In accordance with a preferred embodiment of the invention, the figurines may have one or more different types of owners (and different types of personalities assigned to each figurine) that may include, for example, an explorer which is a person who will enjoy the vicarious travel type of play (e.g. to search for the best pizza in America or just go out into the world to see what happens), a socializer which is the person who wants to get figurines together, get together with other figurine owners, or communicate with people (friends, families or new people) thru the figurines, and an adventurer who is a goal oriented person that will be into having his/her figurine accomplish a specific, unique, hard task (e.g. get to the top of Mt. Everest) A super adventurer is the goal oriented, super explorer. A limited number of figurines may have pre-assigned special tasks/challenges of varying difficulty levels. For example, you could buy a figurine that wants to go to White House (easy), on Air Force One (harder), or onto George Bush's desk in the Oval Office with a picture taken (even harder). Once the mission is accomplished, the Super Adventurer would receive certificate and a place of honor on the site.

FIG. 5 is a flowchart illustrating a method 80 for taking custody of a figurine in accordance with the invention. In particular, each person that comes into contact with a figurine (a custodian or guardian) along its journey in step 82, becomes a custodian of the figurine. The Custodian has the following abilities: to upload images and stories about the figurine, to view the history of the figurine, help the figurine along its adventure, and to communicate (if the Sponsor permits it) with the Sponsor or other Custodians. Thus, in step 84, the custodian may log into the figurine site and enter the unique identification of the figurine. In step 86, the custodian may enter the current location of the figurine into the web site and then send the figurine on to another person to continue its adventure. In accordance with the invention, anyone who has previously held that figurine can track its travels.

When a Sponsor gets a figurine, he/she can determine whether to make the figurine an Explorer or Socializer type. There are also special Super Adventurer figurines as described above that are identified in the store by a special call out on the package. As described above, all figurines can be personalized with a selection of different features such as name, favorite foods, type of music, etc. All customization and adventure features are done at www.gnomads.net. Lastly, there may be a beacon feature on the site that posts to all Custodians to return a particular figurine and then the Sponsor determines how to get it home by communicating with Custodian via email or other.

When the figurine is designated as an "explorer" type, it may have different characteristics. For example, the figurine characteristic may be a message in a bottle wherein the figurine is sent out into the world not knowing just where he'll end up. As another example, the figurine may explore based on geography (all cities in France), interests (best beaches in the world), or locations (all the Starbucks in California). The figurine may also compete is contests, such as company or community sponsored contests in which one or more figurines compete to win a race (e.g. Who can get theirs to all the capitals of Europe first)—these could be sponsored by corporations (Go to all Starbucks in Rocky Mountains) In accordance with the invention, when you personalize the figurine on the web site you specify where your figurine wants to go. Then whenever anyone receives that figurine and logs onto the site, they will see that the figurine really wants to get somewhere in particular. Once the figurine arrives at its destination, the original owner can then either give the figurine a new destination or call the figurine home.

When the figurine is designated as a socalizer, it may also have particular characteristics. In particular, the figurine may be a pen pal wherein a communication is set up with specific person or a family socalizer in which, for example, a Dad may take the figurine on business trip and the kid post message that Dad gets upon arrival and Dad takes picture of the figurine and posts image with new message. The socalizer may also encourage get togethers in which other figurine collectors are met at parties, first game of world series, grandma's house, etc. The socalizer may also be used as part of an exchange program or flash mobs or small figurine clubs where someone takes a group of figurines around.

The figurines may also be used/further customized; for example, physical customization—use markers, hats, other figurine accoutrements to help to distinguish your figurine from others in pictures. The figurine could have a little figurine "gnapsack" or may be hollow for storing little souvenirs from its travels. The figurines may also be used for extended game play, such as bounty hunters, figurine conventions, contests. In accordance with the invention, each figurine may also be customized with its own unique play/adventure pattern in addition to the adventurer types described above.

Figure 6A:
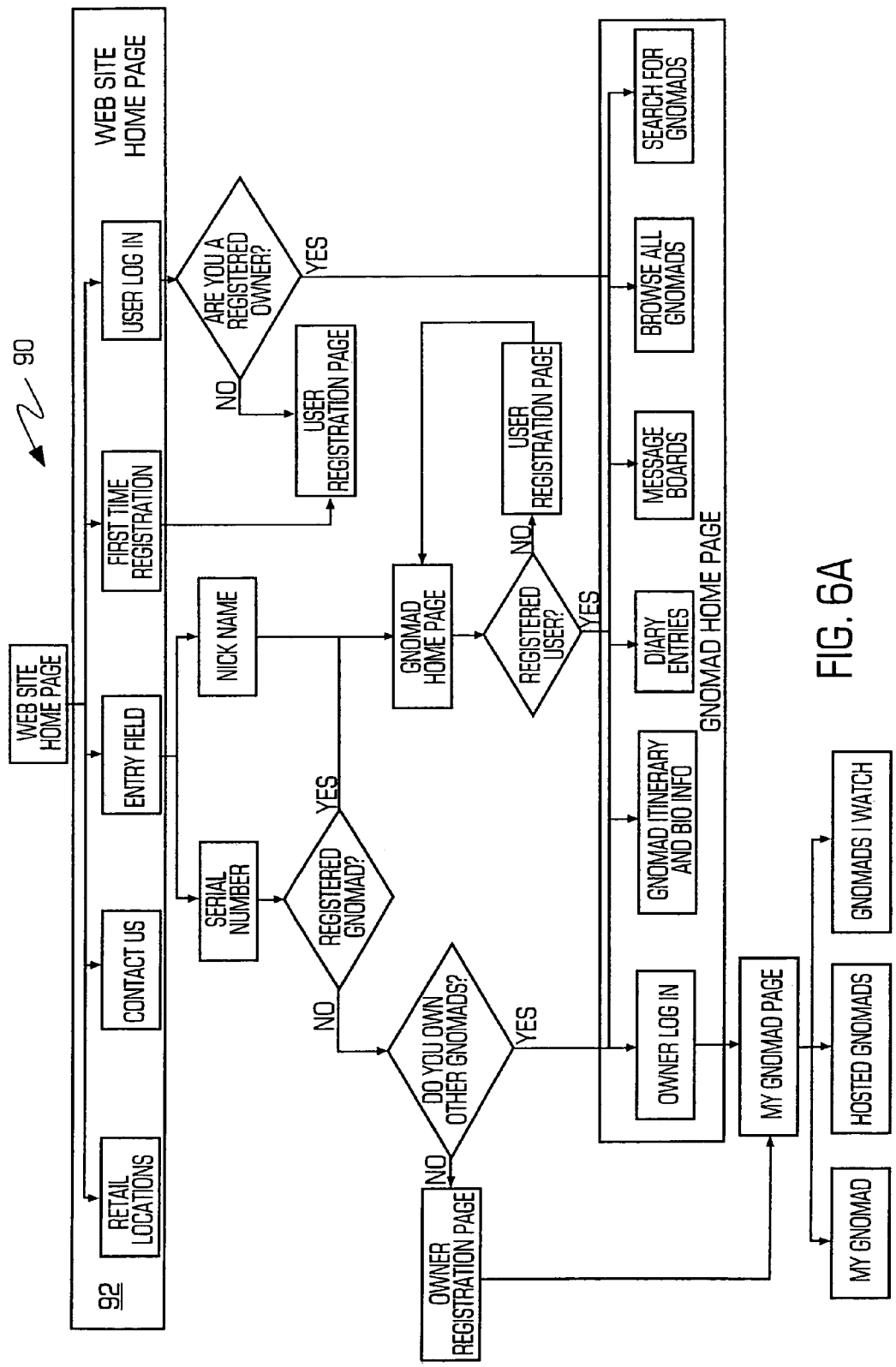
FIG. 6A is a flow diagram illustrating more details of the web site that is part of the adventure figure system in accordance with the invention.
Figure 6B:
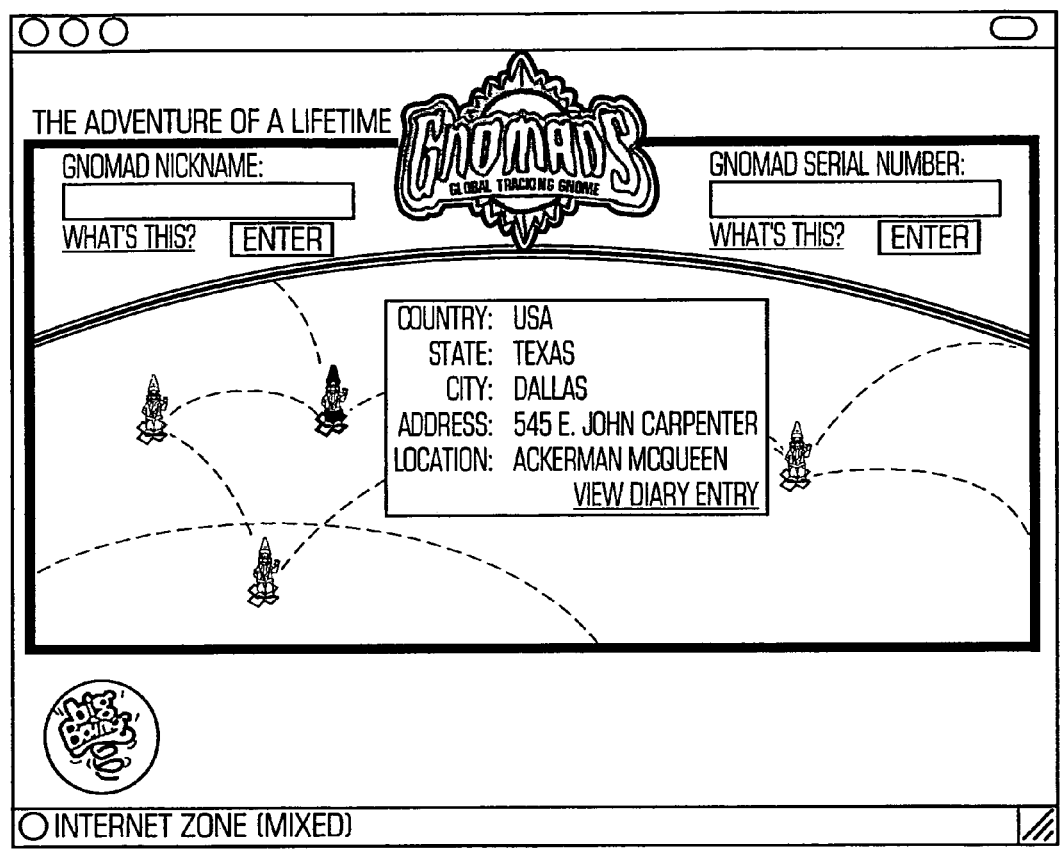
Figure 6C:
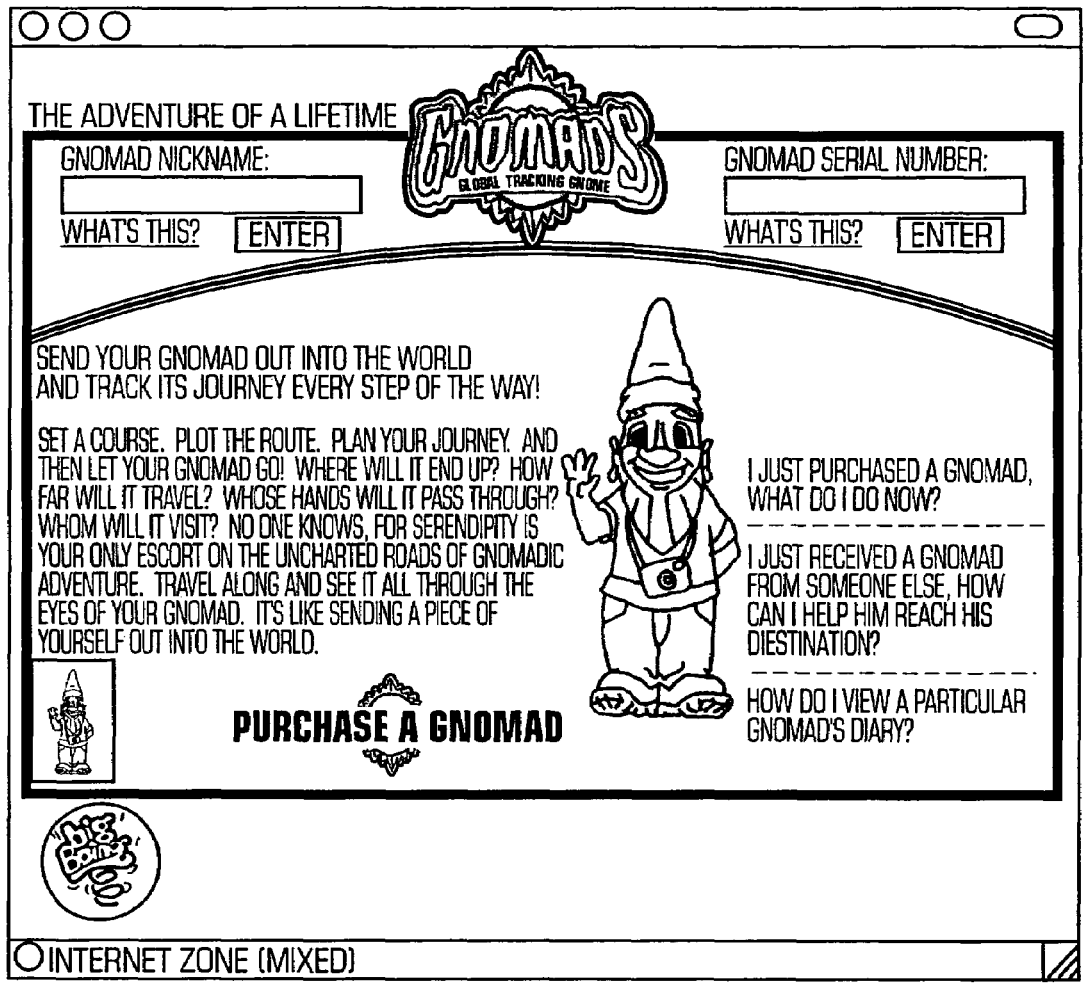
Figure 6D:
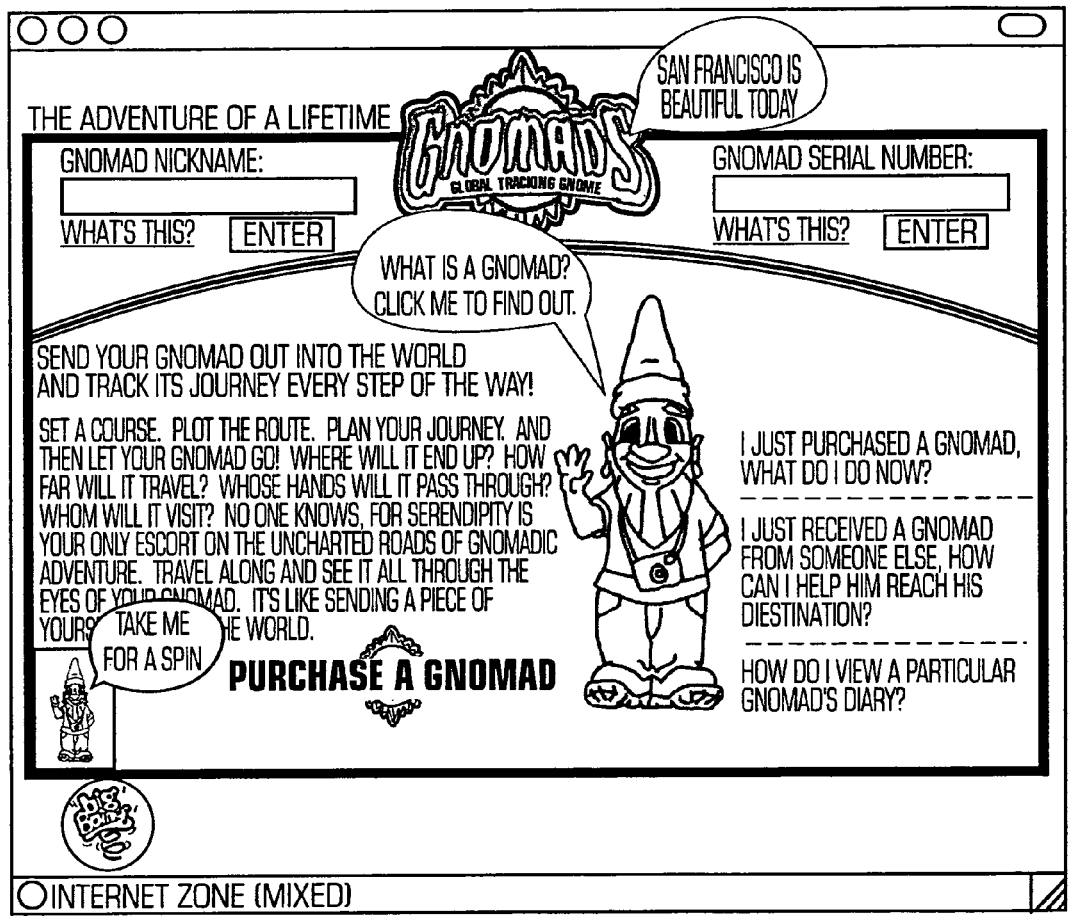
Figure 6E:
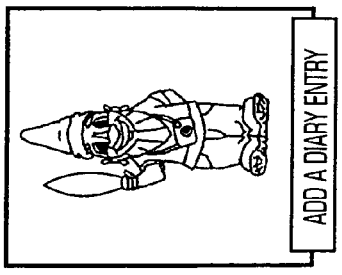
Figure 6F:
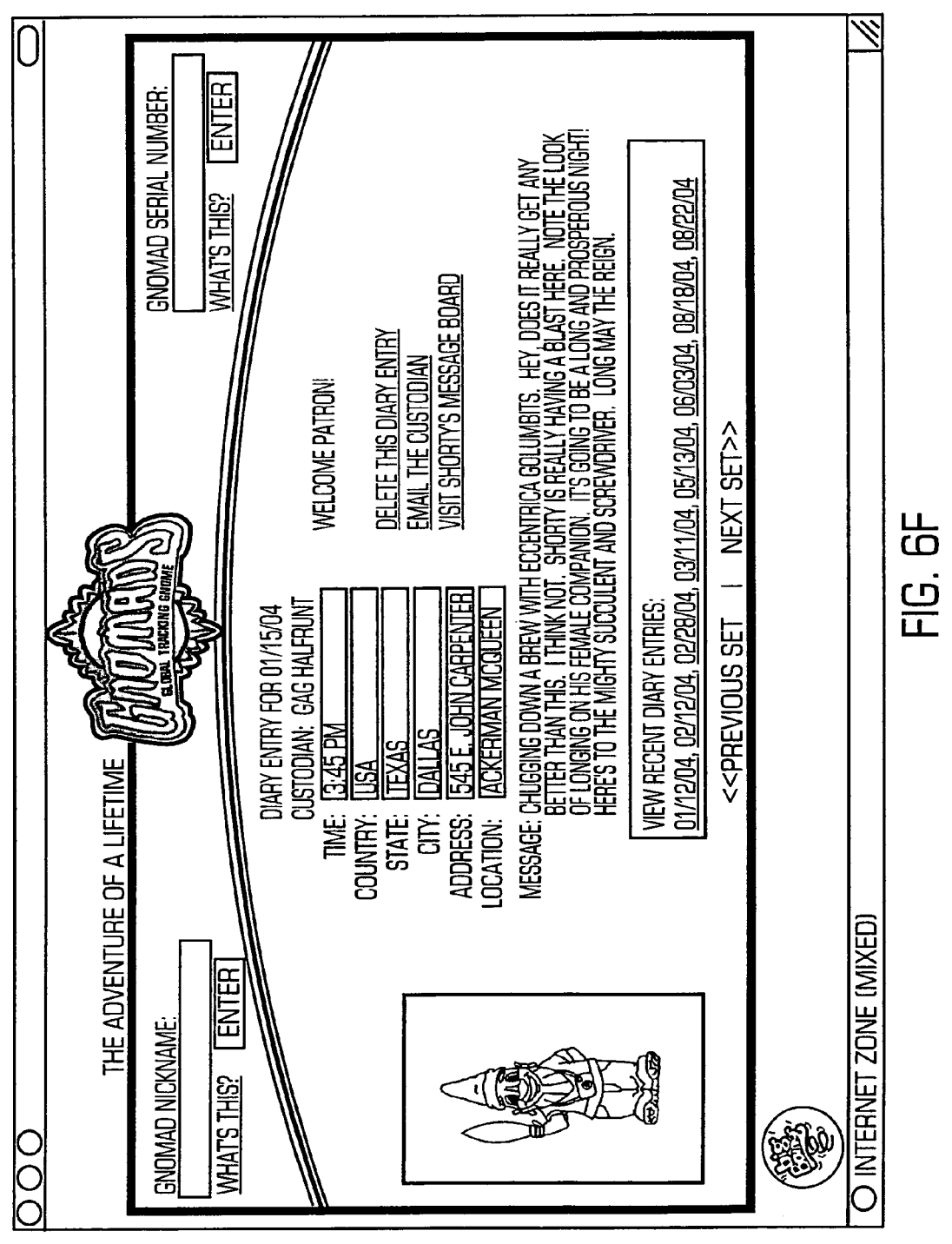
Figure 6G:
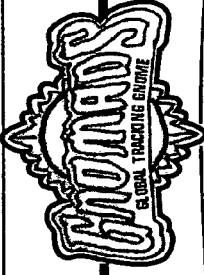

FIG. 6A is a diagram illustrating the web site 90 architecture that is part of the adventure figure system in accordance with the invention. FIGS. 6B–G are screen shots illustrating an example of the user interface of the web site shown in FIG. 6A. FIG. 6A illustrates the different web pages/text entry boxes and links that make up the web site.

As shown in Appendix B, the adventure figure system may include a travel alert wherein the custodian of an adventure figure may be automatically sent a message (for example, an SMS text message over a cellular phone, an email message, et.) indicating that a particular adventure figure has moved to a new location. Alternatively, each adventure figure may contain an embedded location transmitter/receiver, such as a GPS receiver, so that the position of each adventure figure may be tracked by its custodian in real time as the adventure figure is moved. Furthermore, as shown in Appendix B, once an adventure figure has completed its adventure, the system may permit a T-shirt to be ordered that lists each location (and the date) visited by the adventure figure during its recent adventure. The system may also permit a custodian to order a book that is log of the adventures of the particular adventure figure.

Figure 8A:
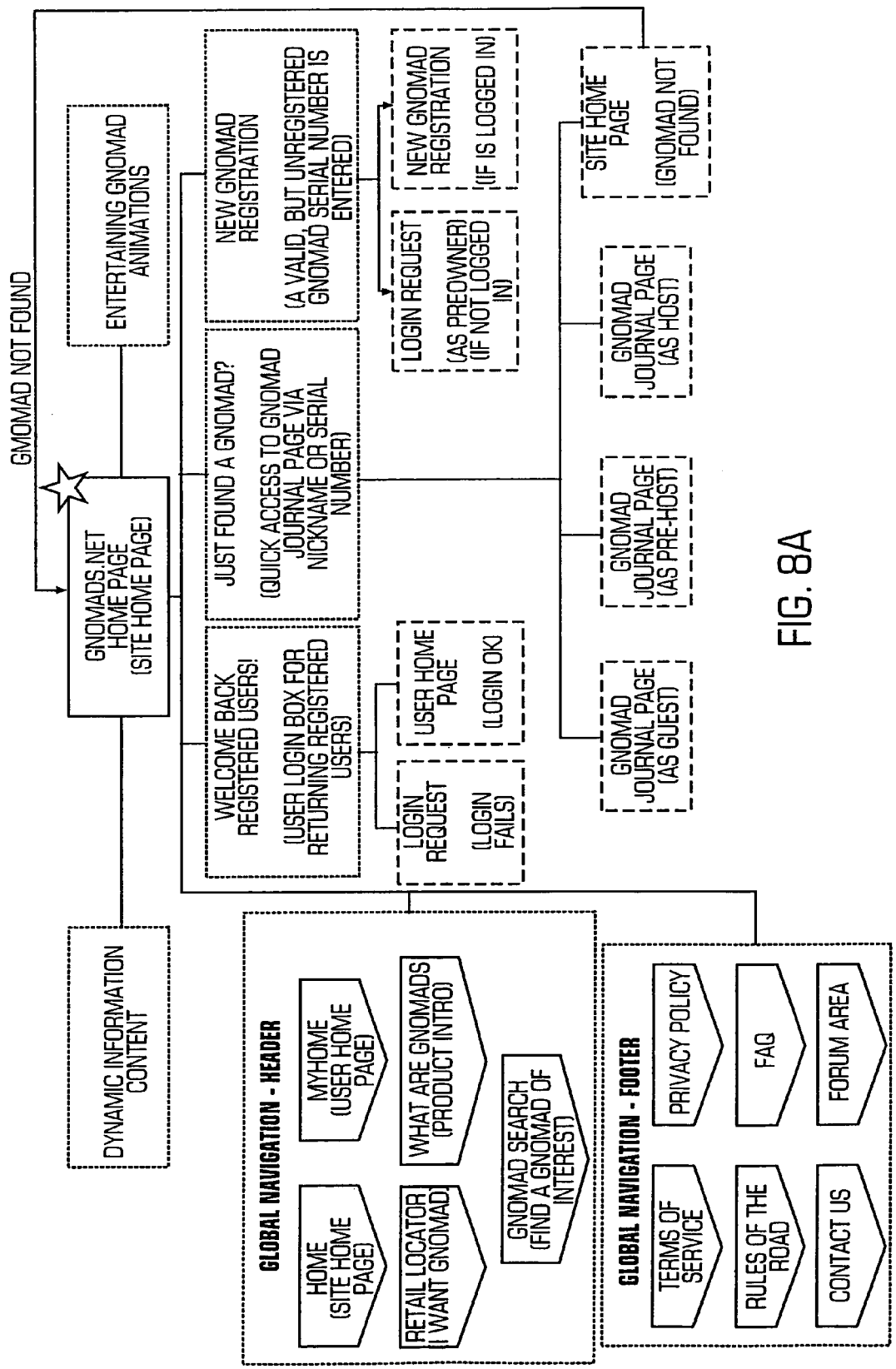
FIGS. 8A–8U illustrate more details of the other embodiment of the web site shown in FIGS. 7A and 7B.
Figure 8B:
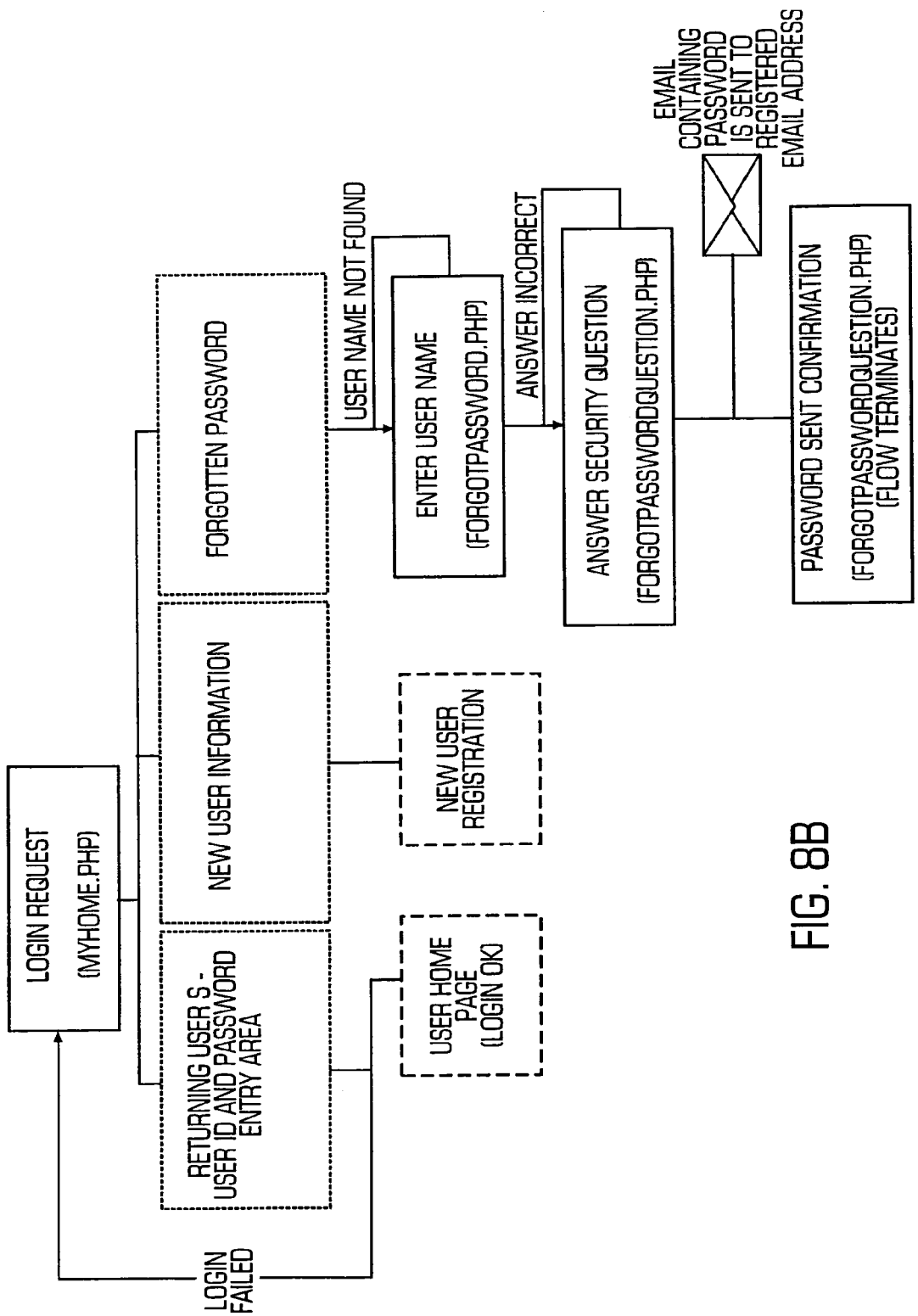
Figure 8C:
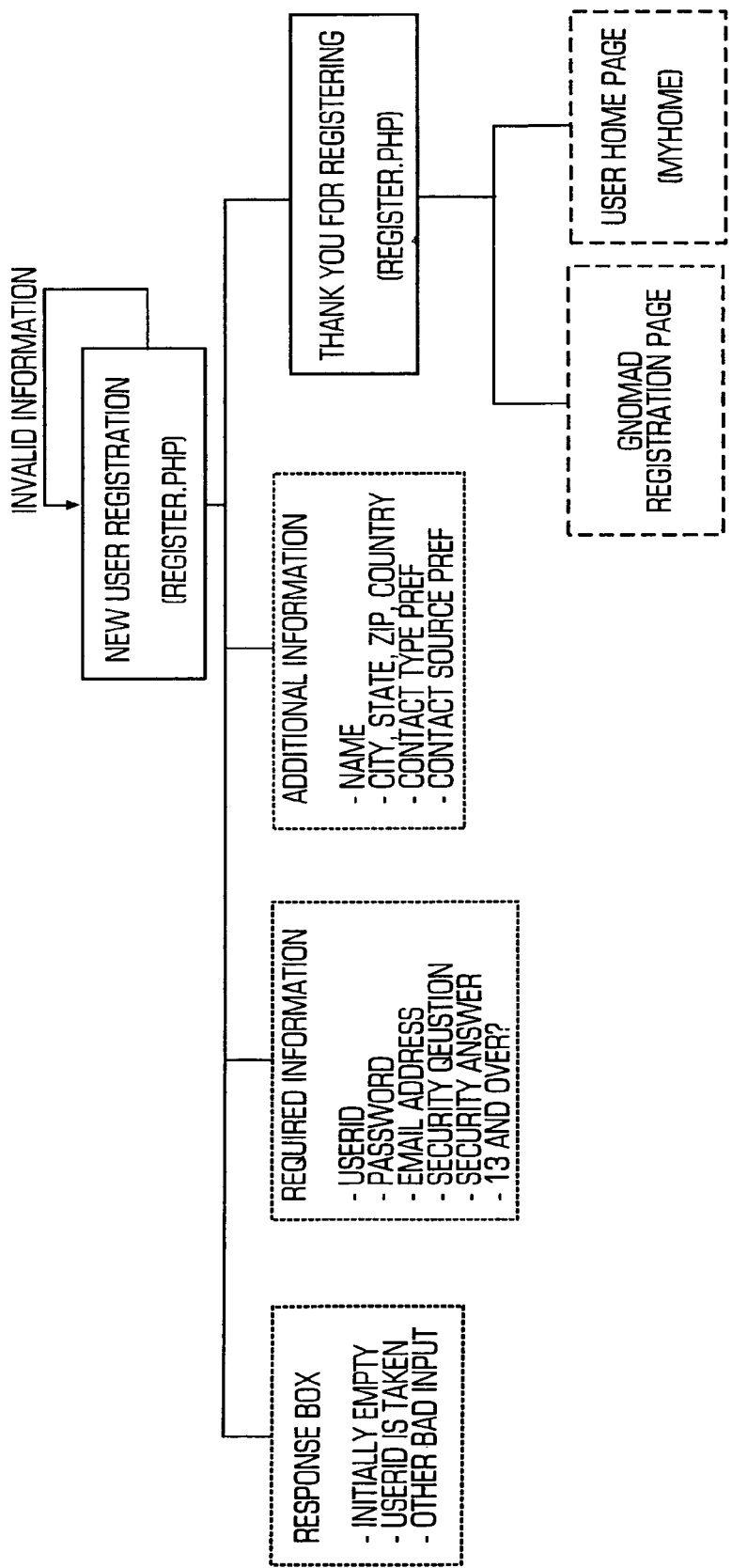
Figure 8D:
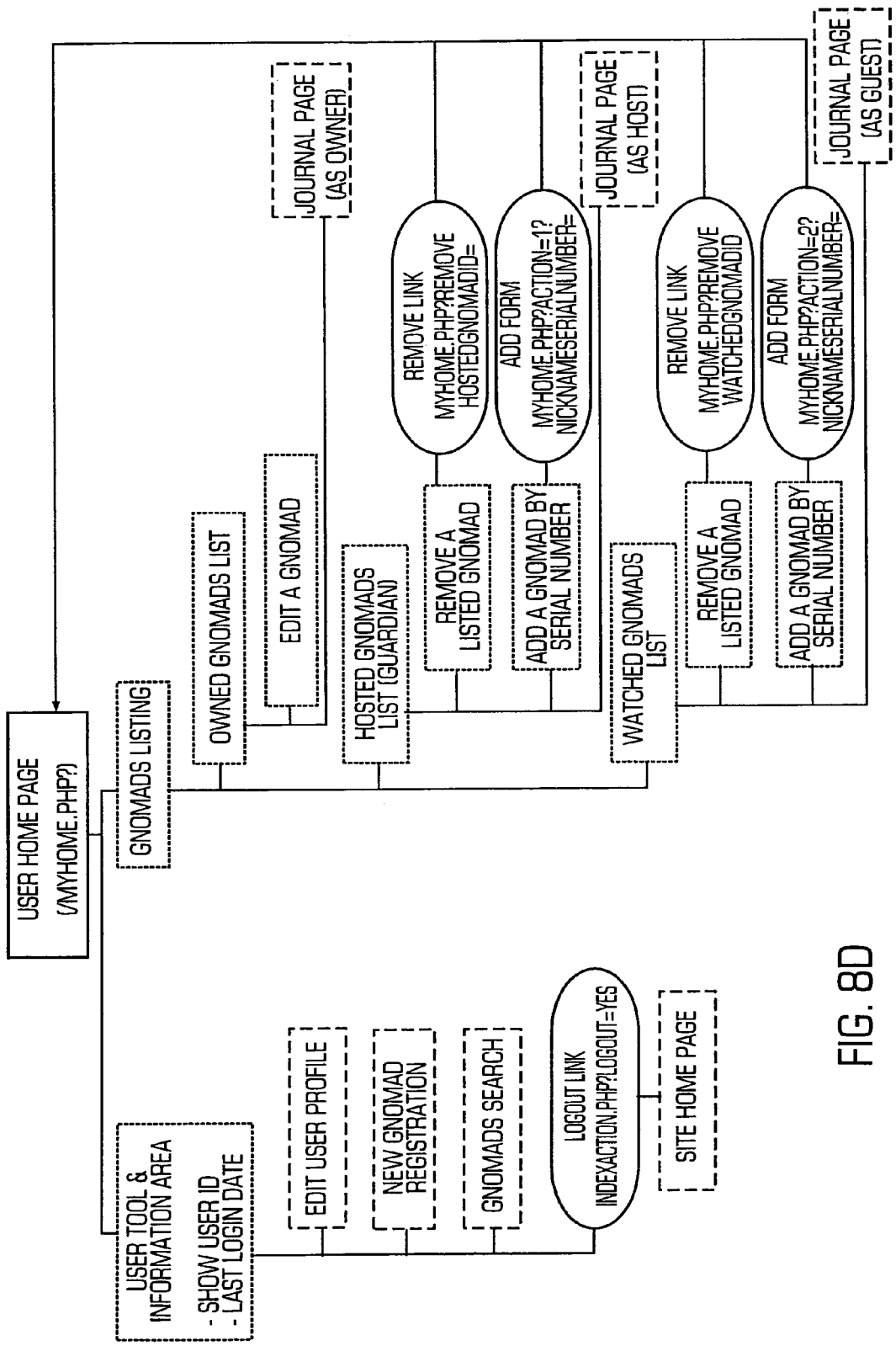
Figure 8E:
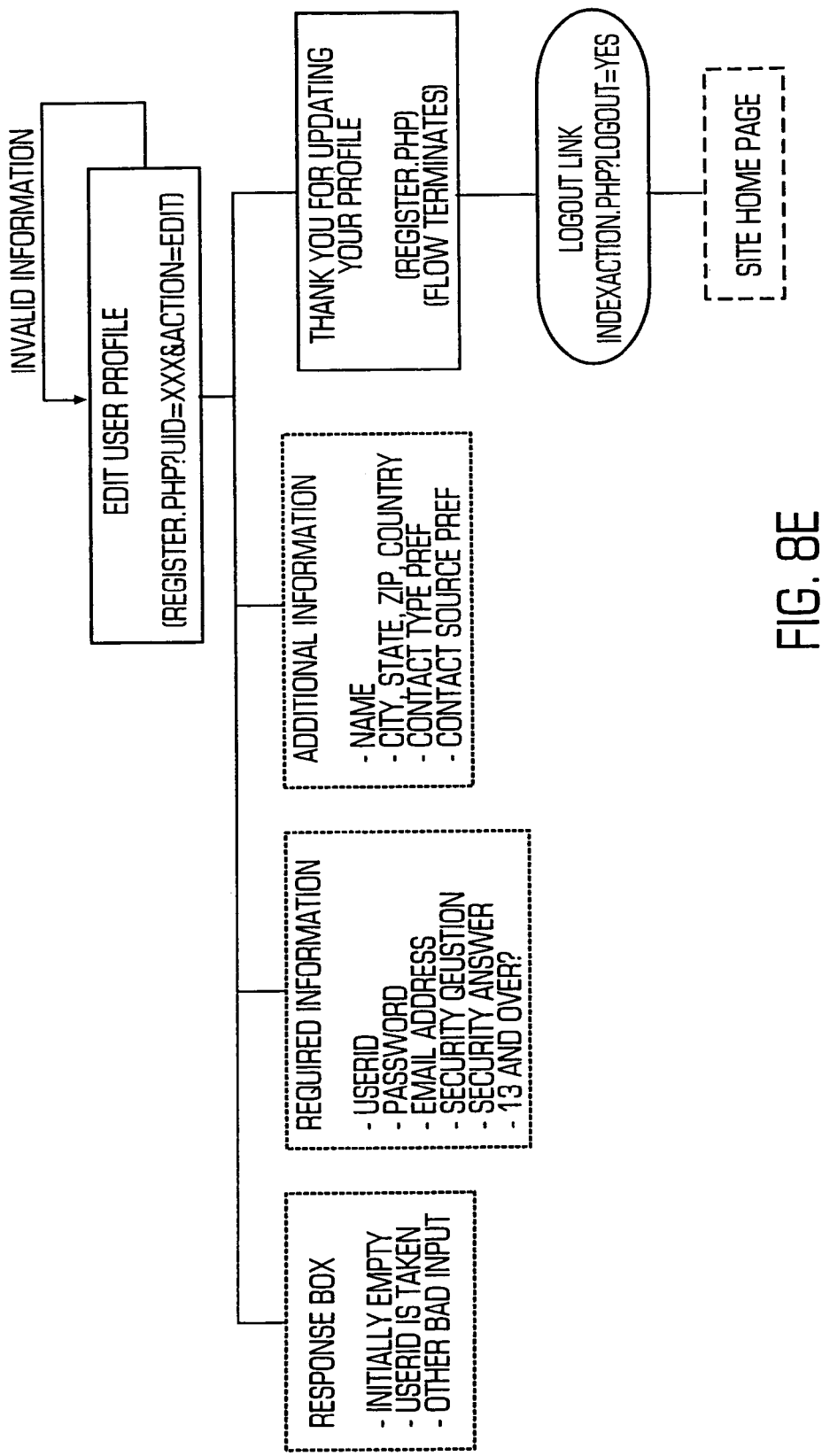
Figure 8F:
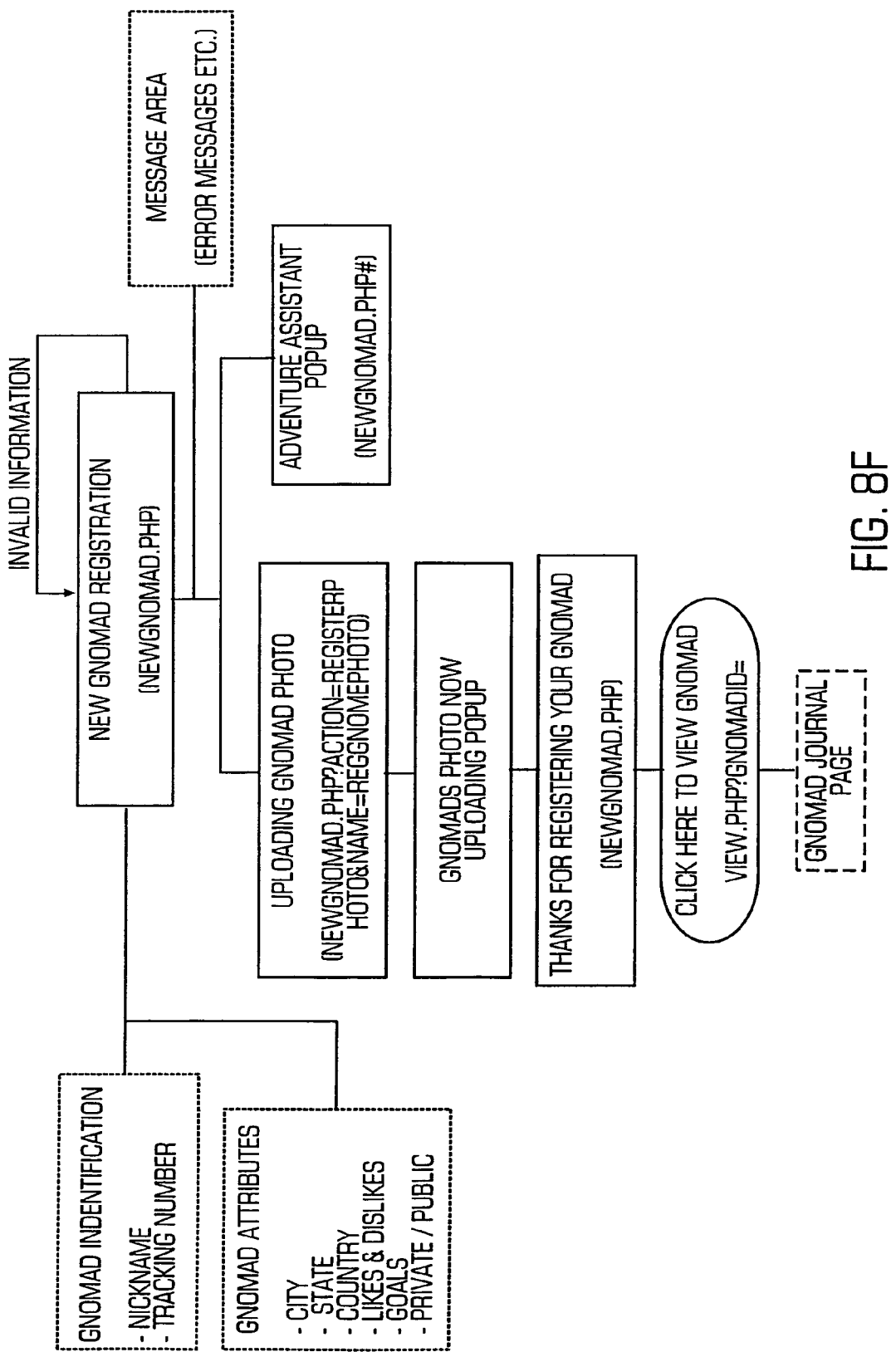
Figure 8G:
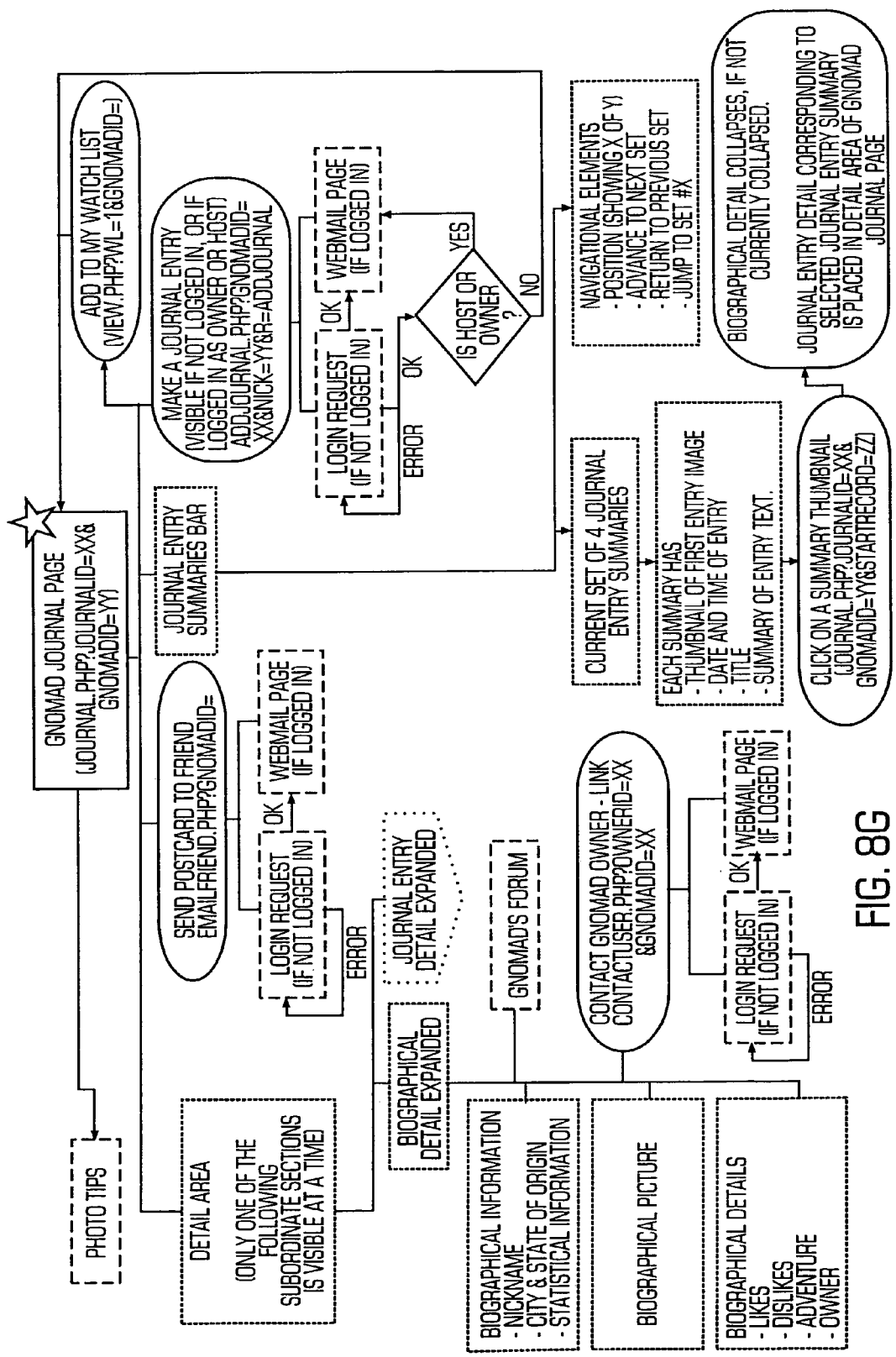
Figure 8H:
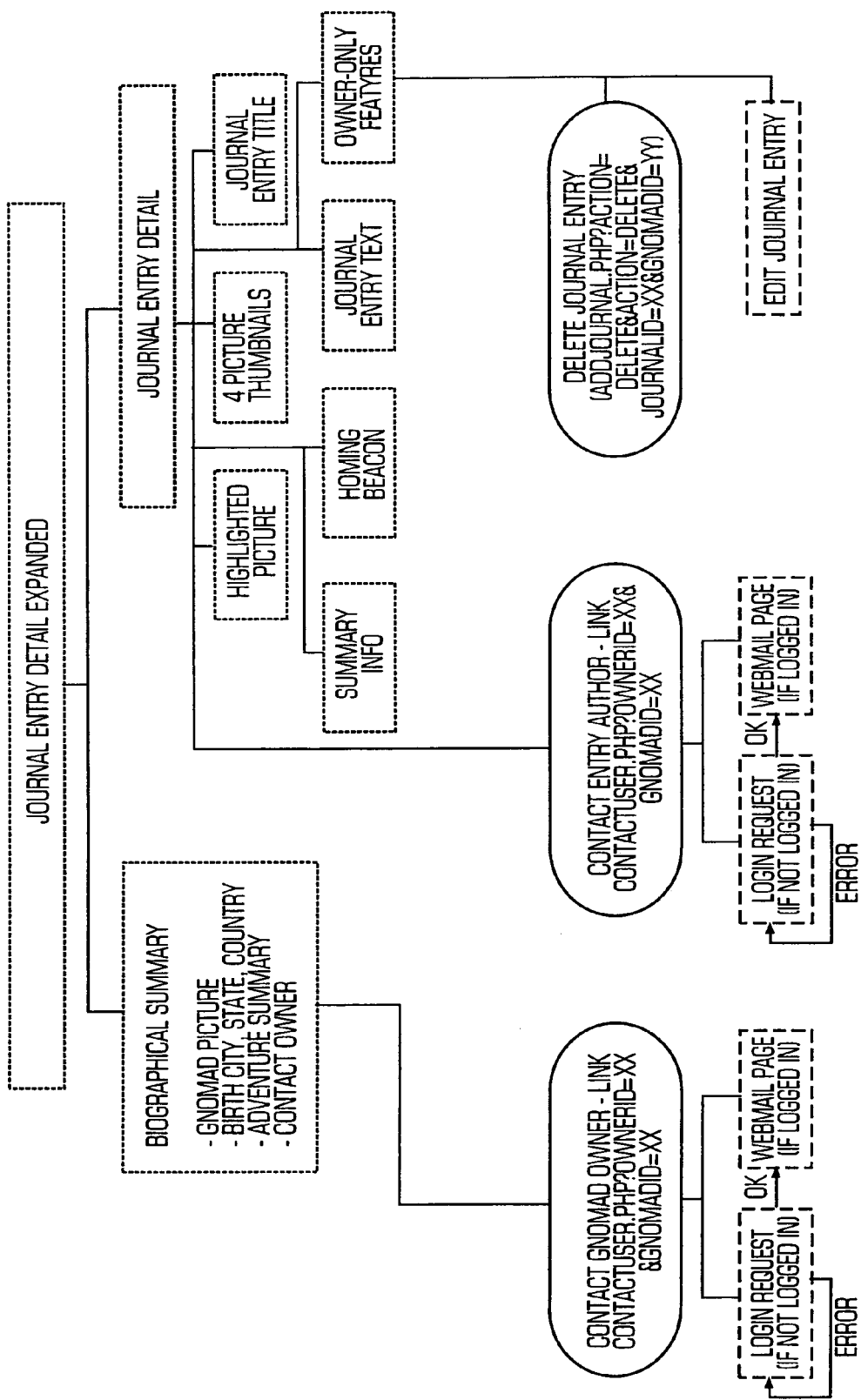
Figure 8I:
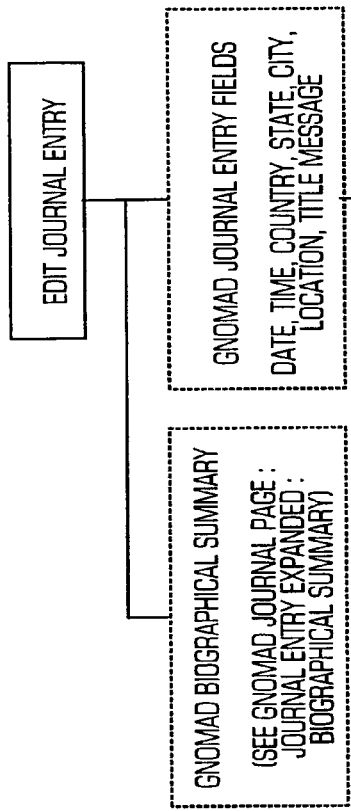
Figure 8J:
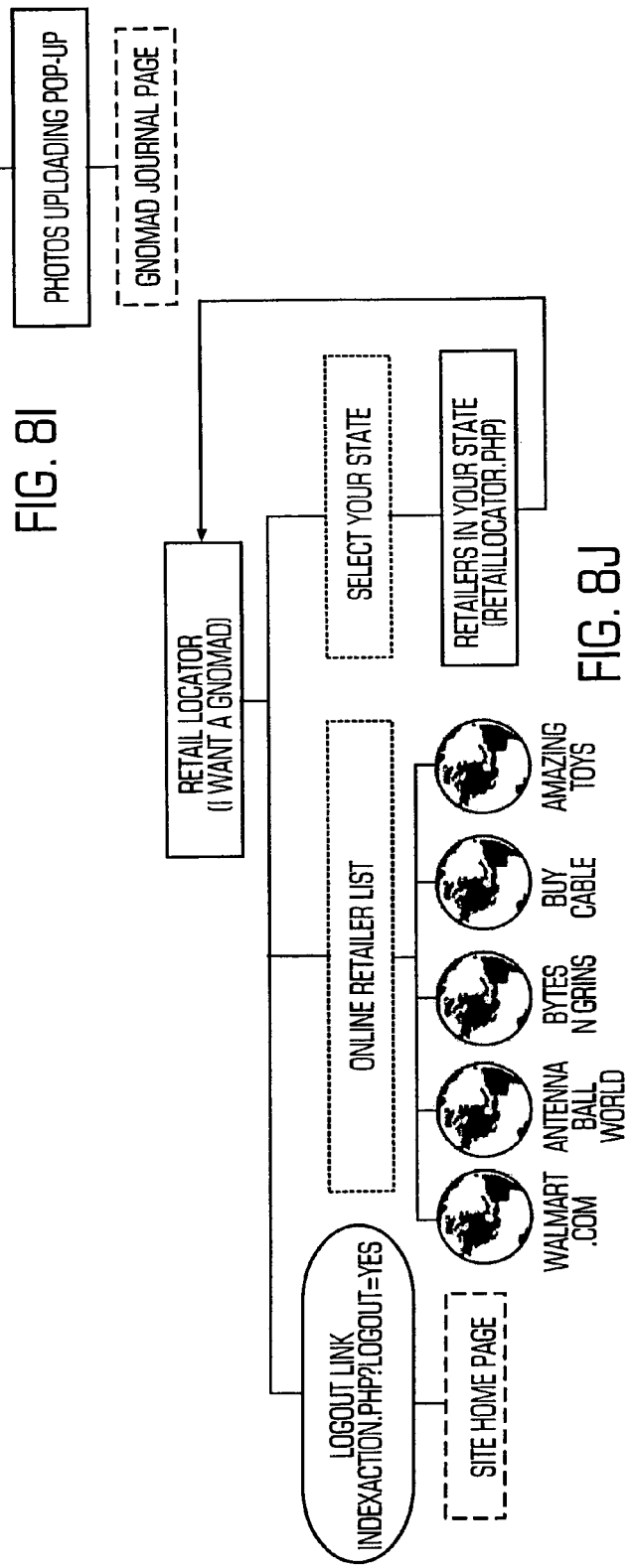
Figure 8N:
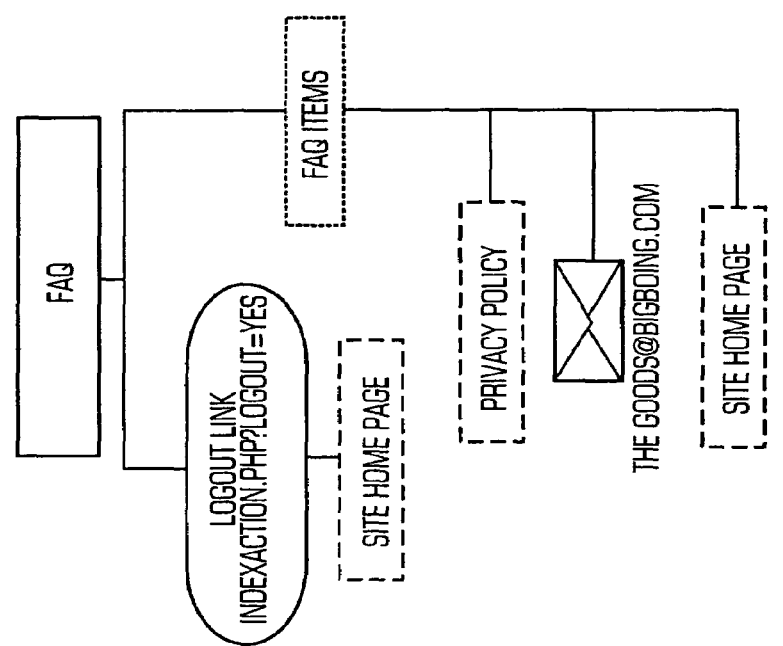
Figure 8M:
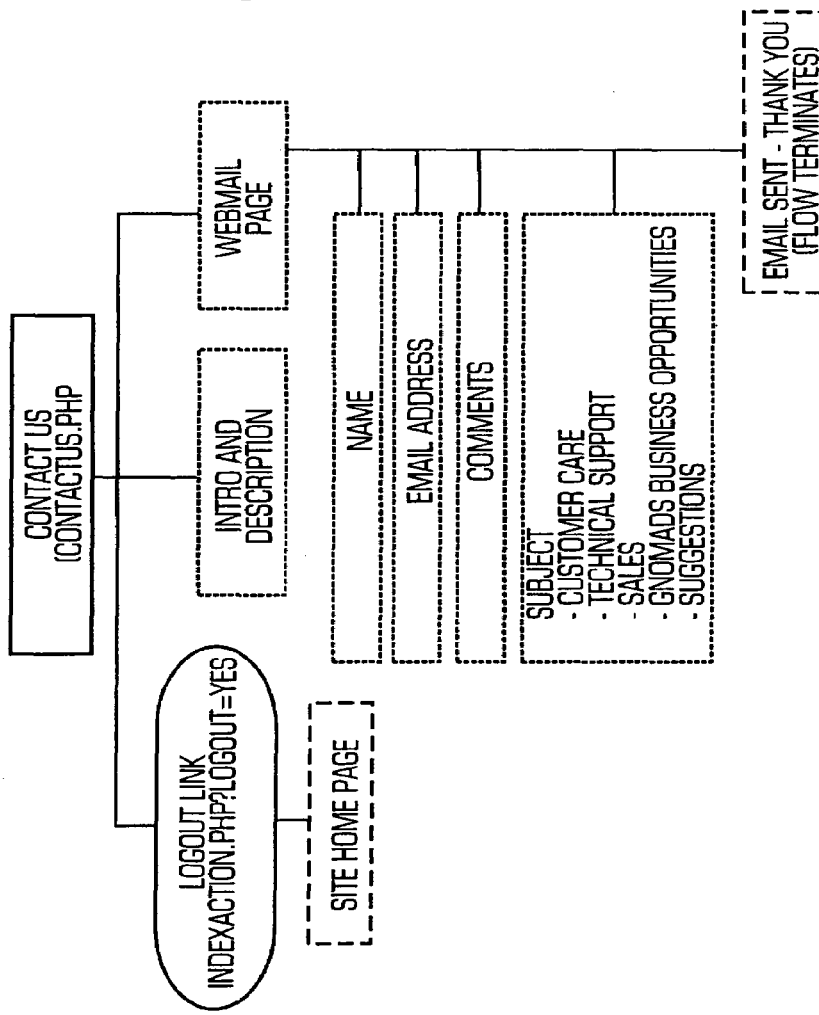
Figure 8R:
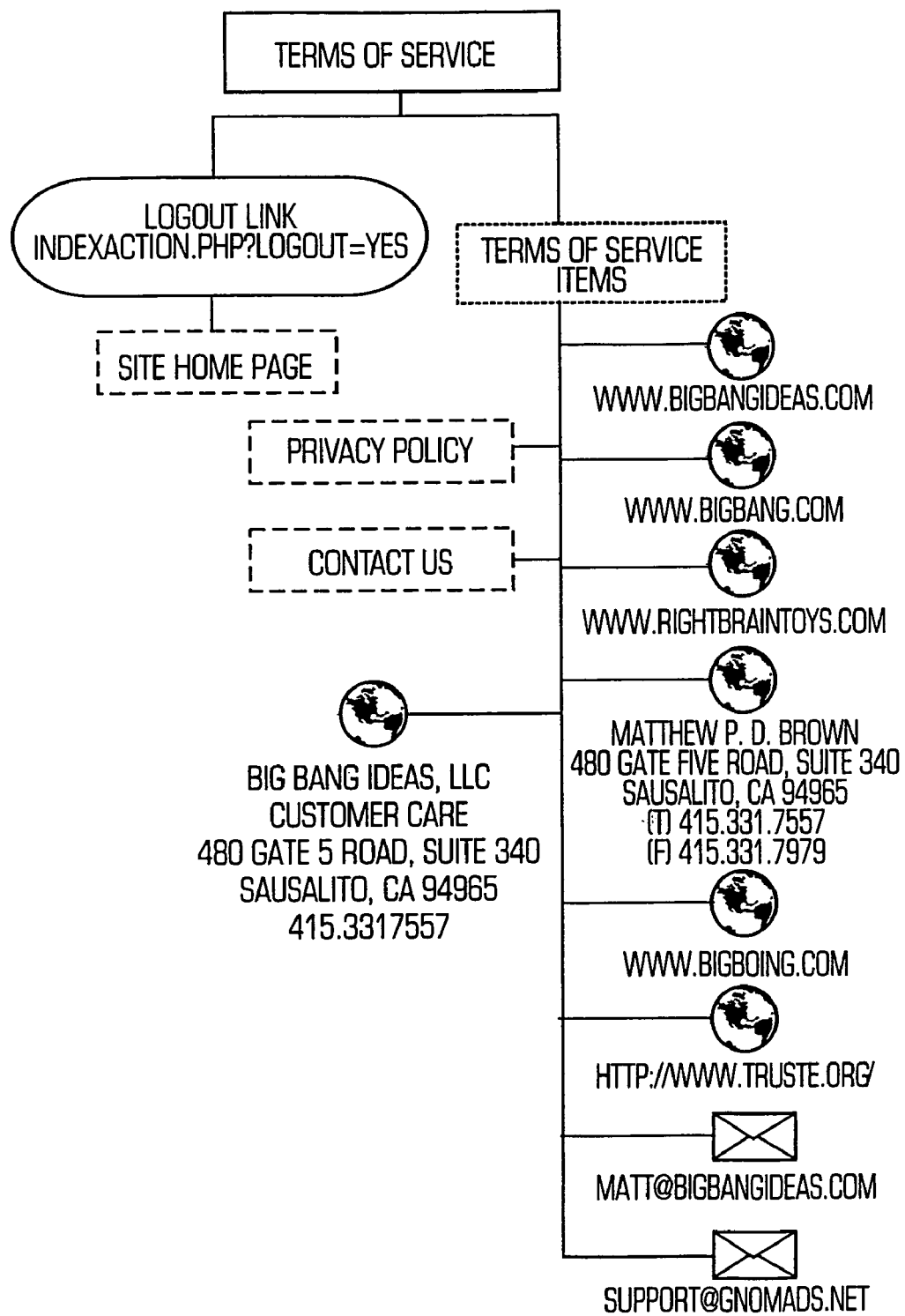
Figure 8U:
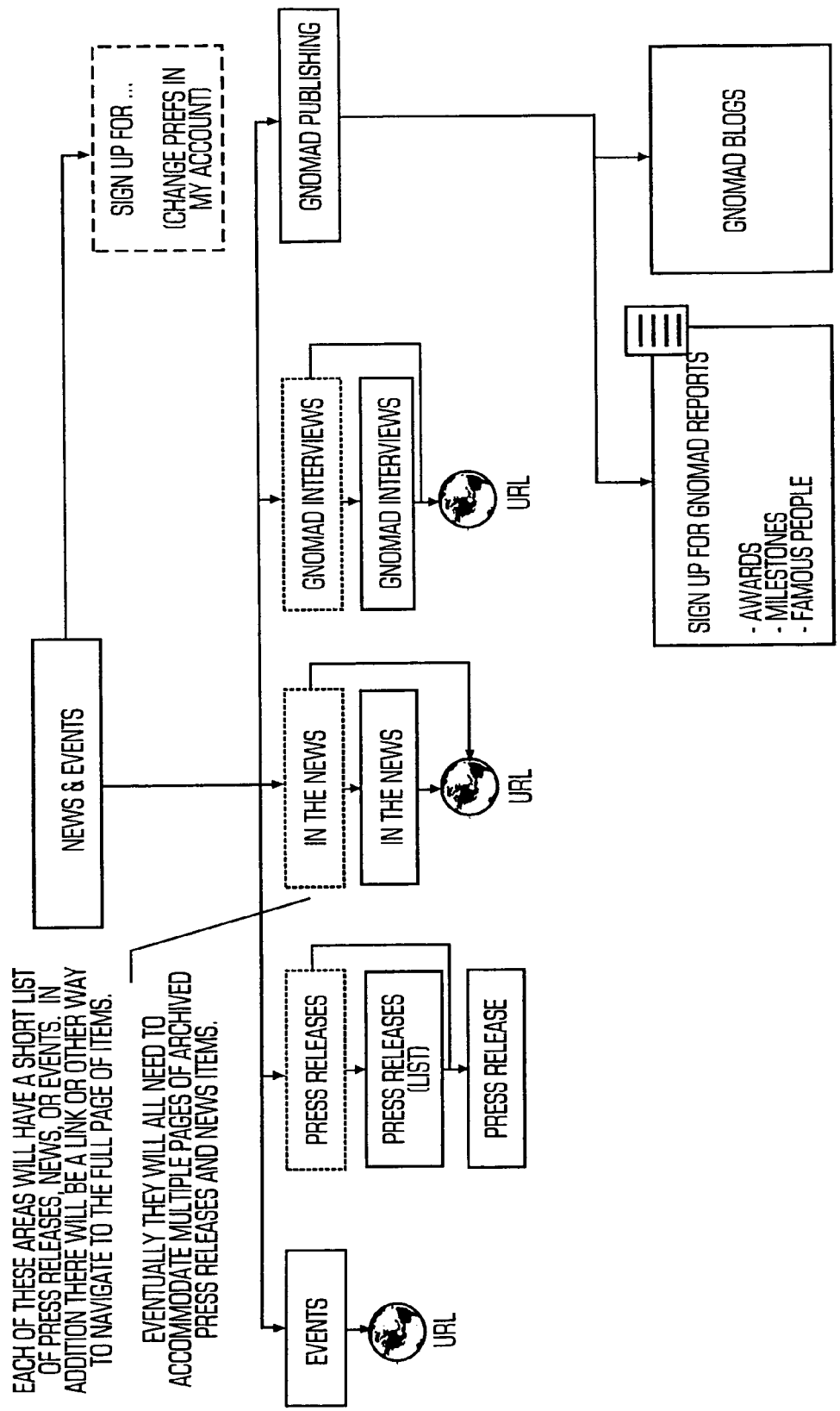

FIGS. 7A and 7B show another embodiment of the web site/web server that is part of the adventure figurine system in accordance with the invention. FIG. 7A illustrates the one or more web pages (and actions) associated with this embodiment of the web site. FIG. 7B illustrates a flow of movement by a user through the web site along with the actions and decisions that occur during the flow of movement. FIGS. 8A–8U illustrate more details of each web page in an implementation of the web site of the adventure figurine system in accordance with the invention.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An adventure figurine system, comprising:
one or more figurines wherein each figurine has a unique identifier associated with the figurine;
a database that stores information about each figurine, the information including a personality of the figurine, the unique identifier of the figurine and an adventure for the figurine; and
a server computer, connected to the database, that permits users to update and alter the information about the figurine based on the adventures of the figurine, wherein the server computer further comprises a security module having a plurality of computer instructions further comprising instructions that, for each user of the system, stores a user password, a nickname of the figurine associated with the user and the unique identifier of the figurine associated with the user and instructions that provide different levels of access to the information in the database for the figurine based on a combination of the user password, nickname of the figurine and unique identifier of the figurine, and wherein the instructions that provide different levels of access further comprise instructions that permit modification of all of the information associated with the figurine if the user enters the user password, nickname of the figurine and unique identifier of the figurine, instructions that permit a custodian access level if the user enters the nickname of the figurine and unique identifier of the figurine and instructions that permit read access of the information about the figurine if the user enters only the unique identifier of the figurine.

2. The system of claim 1, wherein the personality of the figurine further comprises one of a socializer, an adventurer and a super adventurer.

3. The system of claim 1, wherein each figurine is a gnome character.

\* \* \* \* \*